US009922157B1

(12) United States Patent
Ebeling et al.

(10) Patent No.: US 9,922,157 B1
(45) Date of Patent: Mar. 20, 2018

(54) SECTOR-BASED CLOCK ROUTING METHODS AND APPARATUS

(71) Applicant: Altera Corporation, San Jose, CA (US)

(72) Inventors: Carl Ebeling, Redwood City, CA (US); Herman Henry Schmit, Palo Alto, CA (US); Dana How, Palo Alto, CA (US); Mahesh A. Iyer, Fremont, CA (US); Saurabh Adya, San Jose, CA (US)

(73) Assignee: Altera Corporation, San Jose, CA (US)

( * ) Notice: Subject to any disclaimer, the term of this patent is extended or adjusted under 35 U.S.C. 154(b) by 109 days.

(21) Appl. No.: 14/802,702

(22) Filed: Jul. 17, 2015

Related U.S. Application Data

(60) Provisional application No. 62/057,605, filed on Sep. 30, 2014.

(51) Int. Cl.
*G06F 17/50* (2006.01)

(52) U.S. Cl.
CPC ...... *G06F 17/5077* (2013.01); *G06F 17/5081* (2013.01)

(58) Field of Classification Search
USPC ......................................................... 716/117
See application file for complete search history.

(56) References Cited

U.S. PATENT DOCUMENTS

| 8,839,178 | B1 * | 9/2014 | Walsh | G06F 17/5081 716/108 |
| 2002/0178427 | A1 * | 11/2002 | Ding | G06F 17/5054 716/103 |
| 2009/0237134 | A1 * | 9/2009 | Hwang | G06F 1/10 327/165 |
| 2014/0289694 | A1 * | 9/2014 | Ma | G06F 17/5077 716/129 |

OTHER PUBLICATIONS

Kapoor et al., "Dynamically De-Skewable Clock Distribution Methodology", Aug. 15, 2008, IEEE Transactions on Very Large Scale Integration (VLSI) Systems ( vol. 16, Issue: 9, Sep. 2008 ), pp. 1220-1229.*
Xilinx, "UltraScale Architecture Clocking Resources," UG572 (v1.6) Jun. 26, 2017. [Online]. Available: www.xilinx.com/support/documentation/user_guides/ug572-ultrascale-clocking.pdf.

* cited by examiner

*Primary Examiner* — Bryce Aisaka
(74) *Attorney, Agent, or Firm* — Fletcher Yoder P.C.

(57) ABSTRACT

A clock-tree construction method for a configurable clock grid structure having a plurality of sectors and a plurality of wire segments includes defining a clock region within the clock grid structure and constructing an H-tree that has a smallest size to cover the clock region. The method further includes aligning the clock region within the H-tree, pruning the H-tree and removing an unused segment from the H-tree. The method further includes performing a tree height reduction procedure to the pruned H-tree, and generating a clock tree with a reduced size or a reduced height from the tree height reduction procedure.

27 Claims, 20 Drawing Sheets

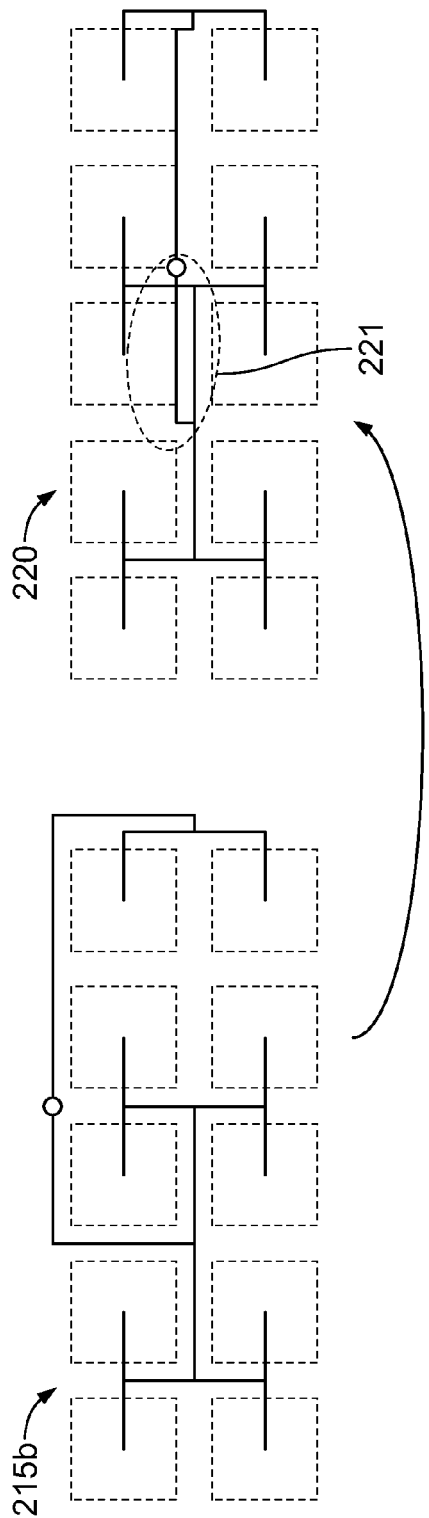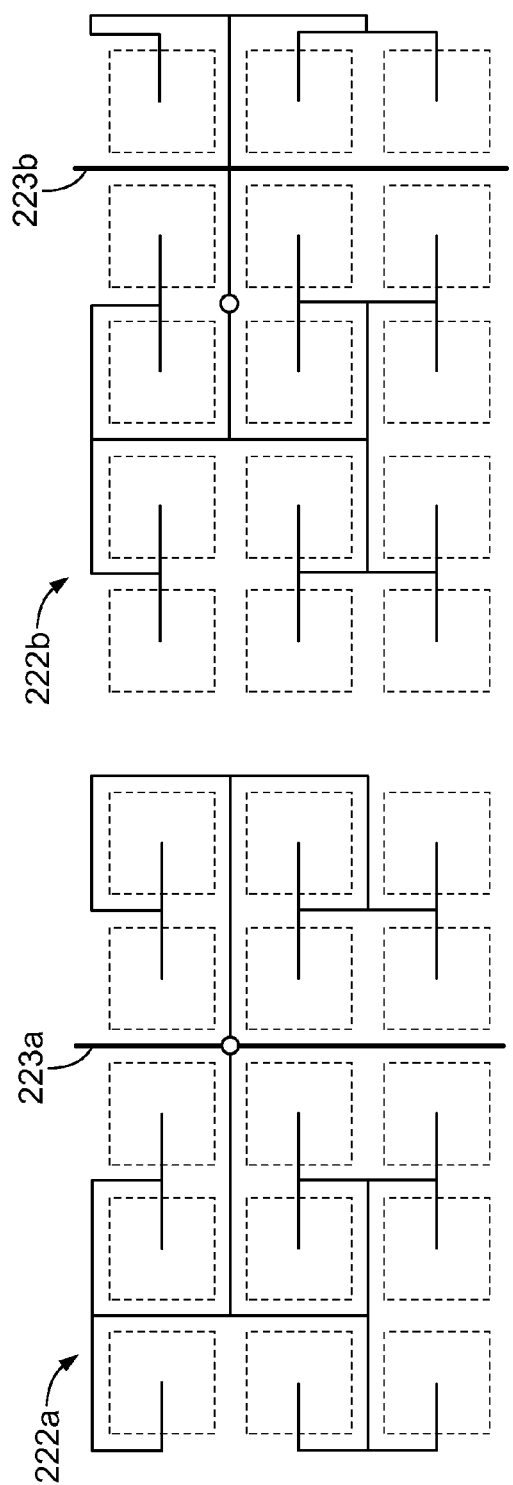
FIG. 8
FIG. 9

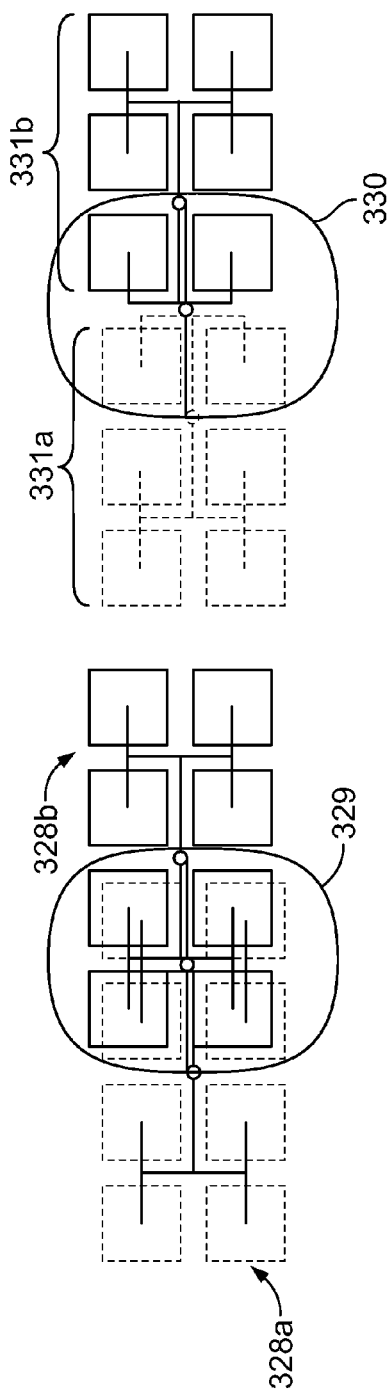
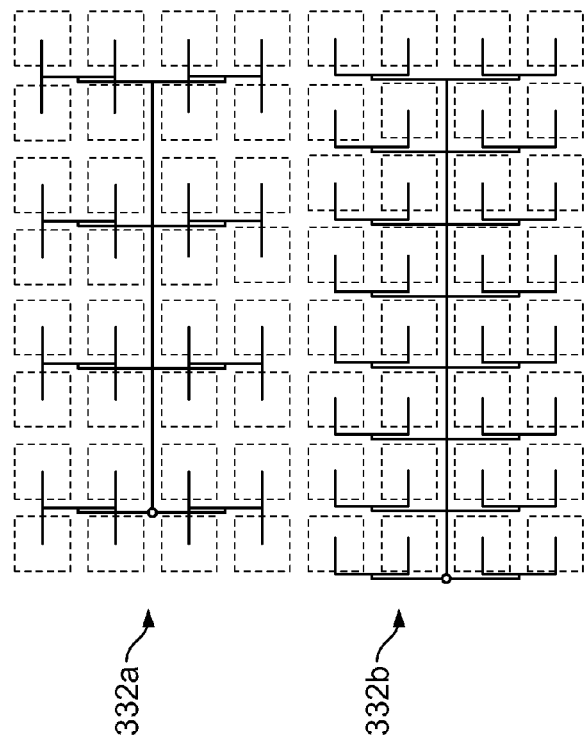
FIG. 14
FIG. 15

SECTOR-BASED CLOCK ROUTING METHODS AND APPARATUS

CROSS REFERENCE TO RELATED APPLICATION

This claims the benefit of commonly-assigned U.S. Provisional Patent Application No. 62/057,605, filed on Sep. 30, 2014, which is hereby expressly incorporated by reference in its entirety.

FIELD OF THE INVENTION

This invention relates to sector-based clock routing methods to create clock trees for a device.

BACKGROUND OF THE INVENTION

Synchronous systems usually use clock signals to operate various components of the circuit. Delays may occur during the transmission of the clock signals because the clock signals are usually distributed from the clock source to various locations within a circuit. Thus the clock delays and variations of these clock delays are to be considered when performing timing analysis to determine if a circuit can operate at a desired frequency. A clock tree can be used to route clock signals from a clock signal input at the root of the tree to "leaves" of the tree at different locations within the circuit.

Clock skew is caused by the unequal delay of the clock signals through different paths in the clock tree from the root to the leaves. A balanced clock tree can be used to reduce the difference in clock delays, and thus the skew between the clock signals distributed at the leaves of the tree can be reduced too. Clock skew can cause problems for both hold time and setup time constraints. When the hold time constraint is violated, the circuit operates incorrectly. When the setup time constraint is violated, the circuit may operate correctly if the clock frequency is reduced, but the performance of the circuit may be compromised.

There can be two types of skew in the clock at two leaves of the tree: known skew and unknown skew. If two paths through the tree use identical buffers and wires, then the delays along the paths will be matched, even if the delay itself cannot be predicted precisely, and the clock skew may be close to zero. Known skew is the skew introduced by the clock tree router due to layout constraints e.g., when paths are not identical. Analytical tools such as the SPICE open-source circuit simulator can be used to estimate the delay difference and thus the known clock skew between two leaves in the tree.

The second type of skew, the unknown skew, is caused by differences in delay in the clock wires caused by factors that may not be predicted, such as random process variations, temperature variations and voltage variations (hereinafter "PVT variation"). For example, some wires may be wider than other wires; threshold voltages may have small random variations, the supply voltage may vary across the chip based on IR drop or instantaneous current flow, and the temperature may be different at different locations because of differences in activity and loading. In addition, cross-talk between wires can also introduce delay variations.

Known skew may be compensated for when constructing the circuit, but it is difficult to evaluate and compensate for unknown skew. For example, timing analysis tools may build in margin for both hold and setup time constraints to account for unknown skew, and such skew may reduce the performance of the circuit. This performance loss is often called "clock loss" because it measures the amount of the clock period lost to margins that are included to compensate for unknown skew so as to meet hold and setup time constraints.

The size of the delay variation caused by PVT is generally related to the length of the delay path. Thus the variation in the clock skew between two leaves is related to the length of the path from the nearest branch point in the tree. The clock-distance between two registers can be the height of the smallest subtree containing the registers. Two registers may be physically close but far apart in terms of clock-distance, and it is the clock-distance that determines the clock loss incurred by a path between two registers. The unknown clock skew can be the greatest between registers in the two partitions created at the top of the tree, or can be the least between registers in neighboring partitions at the bottom of the tree. Thus the clock loss is the greatest for circuit paths that span the two partitions at the top of the tree, e.g., crossing the top-level partition that partitions the tree. Such a path incurs a performance loss that is the maximum clock loss of the clock tree.

SUMMARY OF THE INVENTION

In accordance with embodiments of the present invention, a configurable clock grid containing uncommitted clock wires that can be configured to construct clock trees of arbitrary shape and size is introduced. Throughout this disclosure, the term "clock region" refers to the registers driven by a given clock signal, as well as the area of the device in which these registers are located. In addition to clock signals, the configurable grid structure described herein can also be applied to other high-fanout signals, such as, but not limited to reset and clock enable signals and/or other signals that can be communicated via clock-tree-like structures in a device.

Therefore, in accordance with embodiments of the present invention there is provided a clock-tree construction method for a configurable clock grid structure having a plurality of sectors and a plurality of wire segments. The method includes defining a clock region within the clock grid structure. The method further includes constructing an H-tree that covers the clock region, and aligning the clock region within the one or more H-trees. The method further includes reducing a size or a height of the H-tree to generate a clock tree.

In accordance with another embodiment of the present invention there is provided a clock-tree construction method for a configurable clock grid structure having a plurality of sectors and a plurality of wire segments. The method includes obtaining a clock region within the configurable clock grid structure, and constructing a first H-tree that covers a first region smaller than the clock region. The method further includes constructing a second H-tree that covers a second region smaller than the clock region. A combination of the first region and the second region covers the clock region. The method further includes combining the first H-tree and the second H-tree to generate a combined clock tree, and selectively routing a clock signal through the combined clock tree based at least in part on clock loss performance.

In accordance with another embodiment of the present invention there is provided a clock-tree construction method for a configurable clock grid structure having a plurality of sectors and a plurality of wire segments. The method includes obtaining an initial placement of a plurality of registers within the configurable clock grid structure. The initial placement includes a first location of the plurality of registers. The method further includes defining a clock region based on the initial placement of the plurality of registers, and generating a clock tree that covers the clock region. The method further includes selectively pruning a first subset of the clock tree to generate a first pruned clock tree. The first pruned clock tree has a first clock timing factor. The method further includes modifying the initial placement of the plurality of registers based on the pruned first clock tree.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIGS. 8-9 show example diagrams illustrating alternative implementations of clock tree height reduction;

FIG. 14 provides example diagrams illustrating an alternative method for constructing clock trees having a non-power-of-2 dimension by overlap multiple small power-of-2 trees to cover the region;

FIGS. 15-16 show example block diagrams illustrating alternative implementations of constructing a clock tree with built-in useful clock skew for dataflow from left to right;

DETAILED DESCRIPTION OF THE INVENTION

Unless otherwise indicated, the discussion that follows will be based on an example of a programmable integrated circuit device such as a Field-Programmable Gate Array (FPGA). However, it should be noted that the subject matter disclosed herein may be used in any kind of fixed or programmable device, including, but not limited to, an application-specific integrated circuit (ASIC).

In some embodiments of the invention, the discussion that follows describes a variety of methods for constructing clock trees using a configurable clock grid. The configurable clock grid structure can contain uncommitted clock wires that can be configured to construct clock trees of arbitrary shape and size. For example, the configurable clock grids include a set of fixed orthogonal channels forming a grid. Each channel contains a set of pre-routed and pre-buffered wire segments that are used to construct clock trees. At the intersection of the clock channels in the grid are clock multiplexors that select via configuration how the clock segments are connected. This configuration can construct clock networks of arbitrary size in the grid. Further discussion of configurable clock grid structures can be found in copending, commonly-assigned U.S. patent application Ser. No. 14/752,393, filed on Jun. 26, 2015, which is herein expressly incorporated by reference in its entirety.

Figure 1:
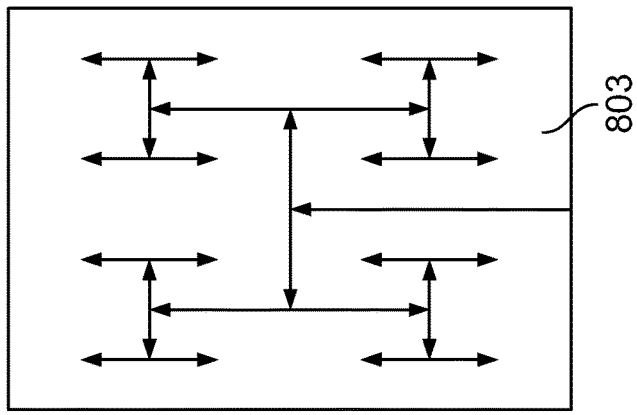
FIG. 1 shows example block diagrams illustrating example H-trees within a clock region.
Figure 1:
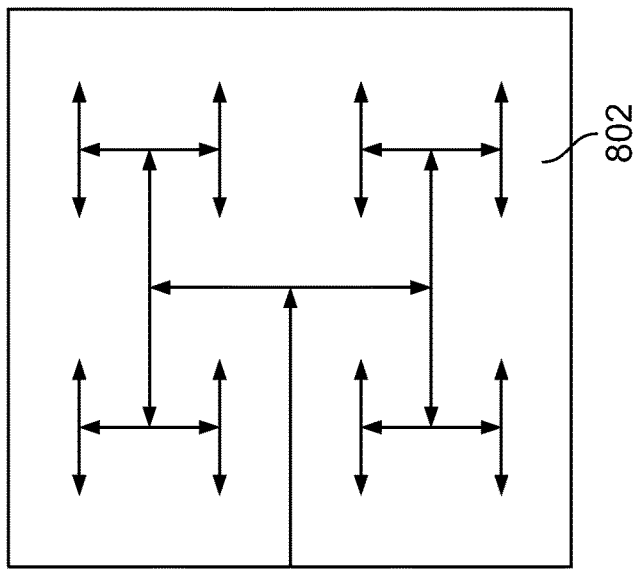
Figure 1:
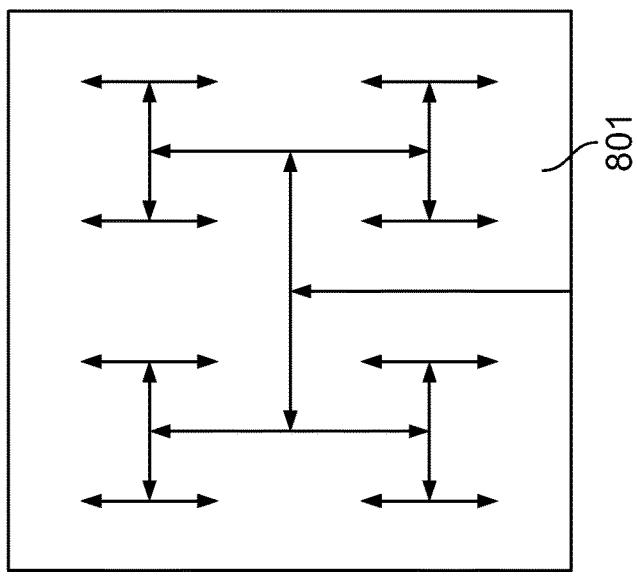

FIG. 1 shows example block diagrams illustrating example H-trees within a clock region. H-trees (e.g., 801-803) can be used in a circuit as a clock tree network to allow a clock signal or other global signals to be introduced at a single point from the clock source and be delivered to all points within the entire device with reduced skew.

In some instances, the H-trees can be implemented on an ASIC device, or an FPGA can have sets of fixed clock trees built into the fabric for clock tree generation. These clock trees can generally be built in varying sizes, and the fitter will select the appropriate clock tree based on the size of the clock domain, and the location of the components in the clock region.

Balanced clock trees can be used in order to reduce clock skew. Clock skew can be included in clock tree generation to adjust timing parameters, such as set up and hold constraints for registers. Clock tree generation, however, can be limited by the fixed locations of the clock channels. Unlike in an ASIC, where the area can be arbitrarily bisected, the locations for bisecting a clock domain may be limited in an FPGA whose clock structure must be pre-determined and used for arbitrary circuit implementation. Thus in a configurable clock structure where the dimensions of clock domains may not be numbers that are powers of two, it may be challenging to efficiently implement clock domains, and to determine a number of alternative paths to distribute a clock signal. In addition, the configurable clock grid structure can be used to construct a clock tree with less clock skew by running the clock in a primary direction of data flow to allow for more time per cycle, and to fix setup time issues, or alternatively by running the clock against the direction of data flow to fix hold time violations, or by overlapping clocks at clock intersections to allow a fitter to choose the best branch of the clock for every timing path.

Figure 2:
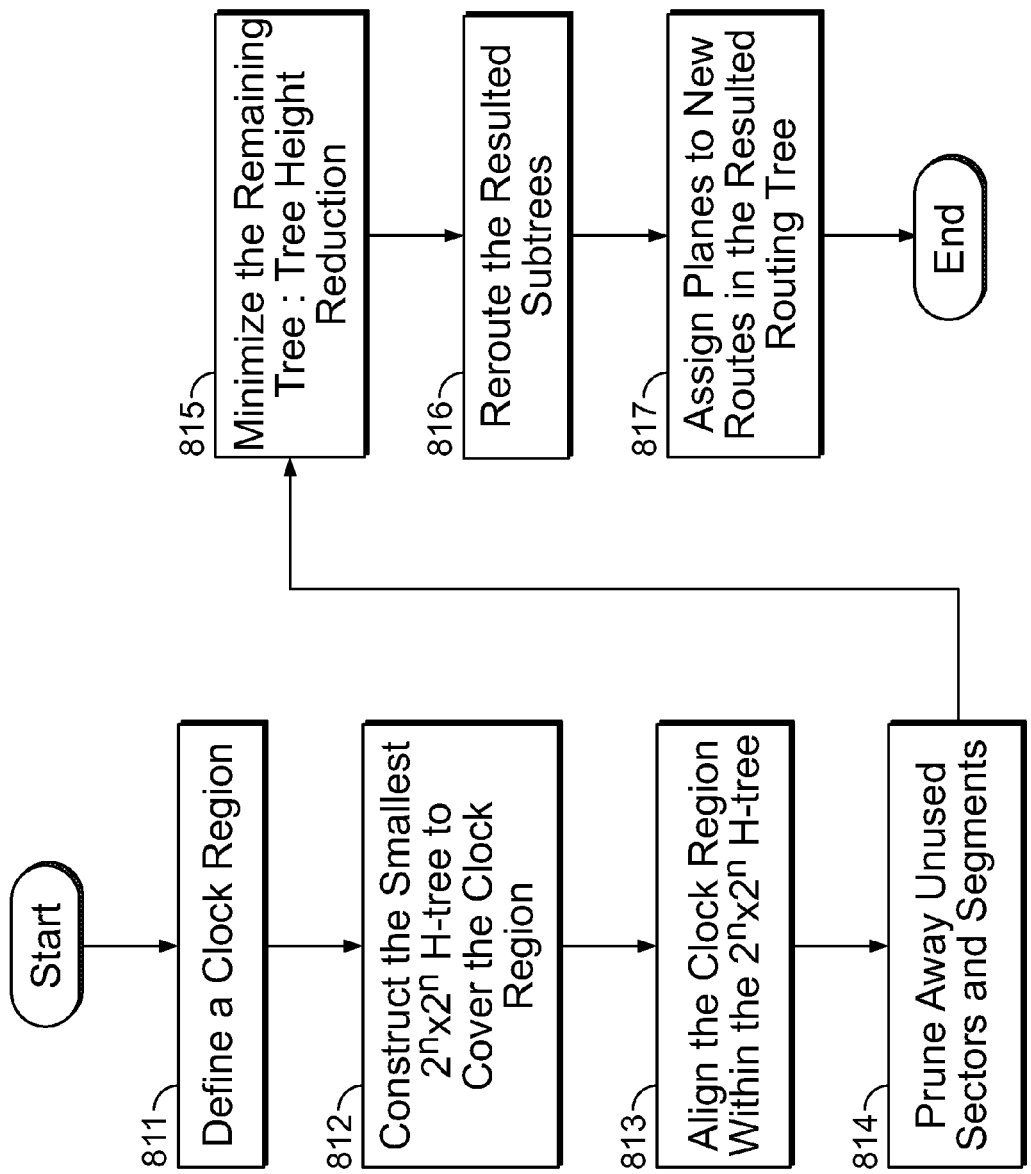
FIG. 2 shows an example flow diagram illustrating high-level work flows for minimum H-tree construction over an arbitrarily sized clock region.

FIG. 2 shows an example flow diagram illustrating a high-level process for minimum H-tree construction over an arbitrarily-sized clock region. Starting with a grid of circuit tiles, the clock tree generator can define a clock region at 811. Such clock regions can be defined iteratively together with placement of the registers to improve hardware resource, e.g., as further discussed in FIGS. 3-4. The clock region can be of an arbitrary shape and size, e.g., non-rectangular, a region with holes, and/or the like. At 812, a smallest $2^n \times 2^n$ H-tree can be constructed to cover the defined clock region. Example $2^n \times 2^n$ H-tree generation processes are discussed in FIG. 5.

At 813, the defined clock region can be aligned within the H-tree. For example, the root of the clock region lies in lower-left H-tree quadrant such that the clock region can be flipped in X/Y coordinates after minimization of the clock tree. Or the alignment can allow flexible placement of partition boundaries. Lower-left corner alignment can often facilitate generation of a minimal height tree. It is worth noting that the alignment does not limit the center or root of the H-tree to be placed at a specific position relative to the clock region; instead, the root of the H-tree can be placed in a position as long as the H-tree convers the clock region.

Figure 6:
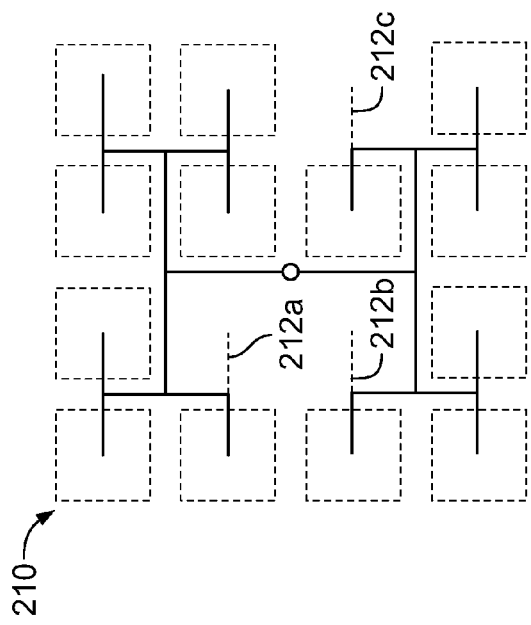
FIG. 6 shows an example representation of a device area illustrating pruning the clock tree when some sectors do not use the clock signal.
Figure 7:
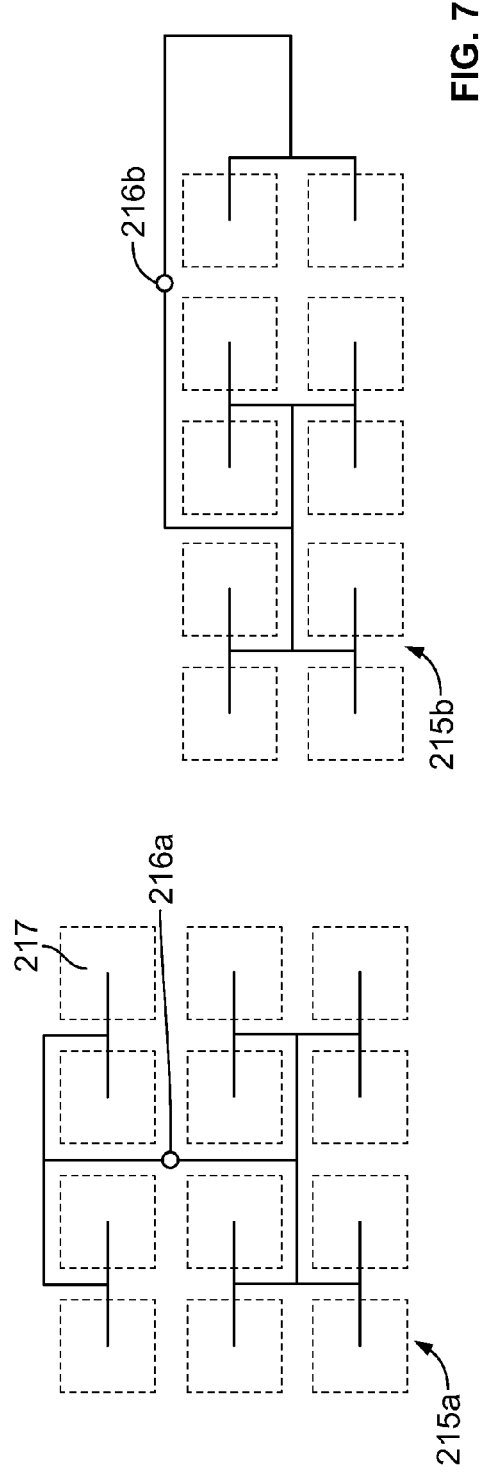
FIG. 7 shows an example representation of a device area illustrating pruning the clock tree to cover non-canonic clock region sizes.
Figure 10:
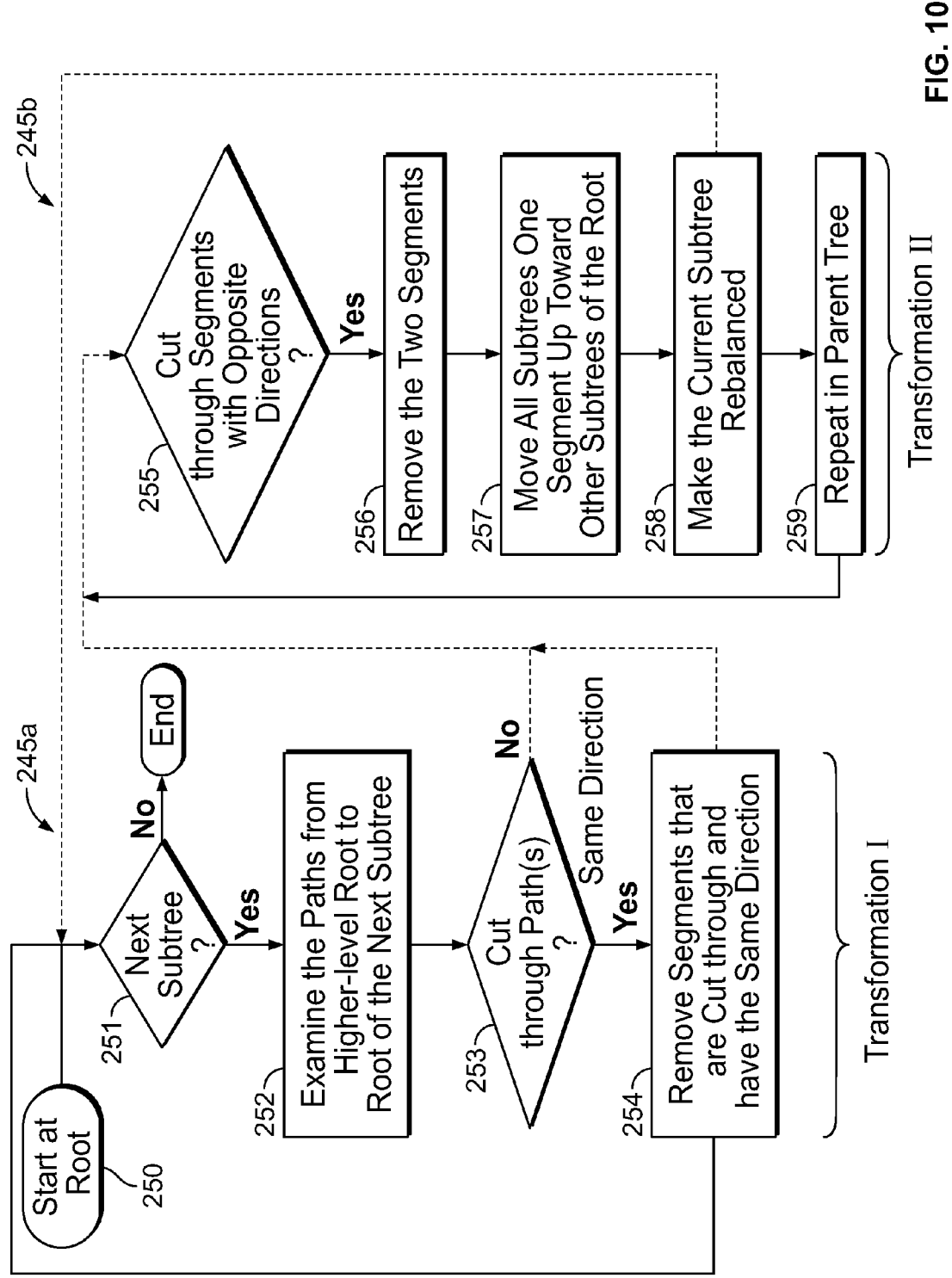
FIG. 10 shows a logic flow diagram illustrating an iterative tree height reduction procedure.

At 814, the unused sectors and segments from the $2^n \times 2^n$ H-tree can be pruned away to save hardware resources, as further illustrated in FIGS. 6-7. Tree-height reduction can then be applied to minimize the remaining tree at 815. For example, tree-height reduction can be applied to minimize the size and height of the clock tree (as illustrated in FIG. 10).

At 816, the resulting subtrees may be rerouted, e.g., by identifying a new root and subtree roots. Clock planes (e.g., wire segments in the clock channel among the clock sectors, etc.) can then be assigned to the new routes, or clock signals are assigned to the clock planes at 817. For example, a clock tree may span different clock planes. A clock router can sort clock regions by size, in decreasing order and then select a clock plane for which the clock tree has no conflicts and route from the clock source to tree root. If the routing fails, the next clock plane with no conflicts may be tried. This process can be iteratively repeated until the clock tree has been assigned to clock planes from the root to the leaves.

Figure 4:
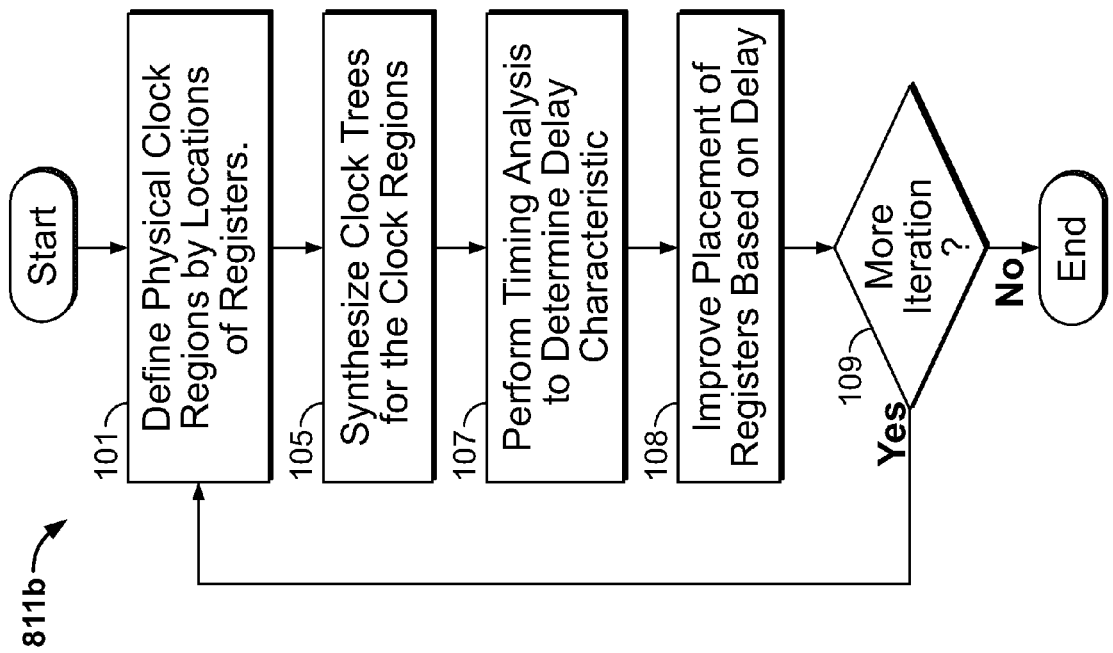
FIGS. 3-4 shows an example flow diagram illustrating alternative aspects of defining a physical clock region within a circuit.
Figure 3:
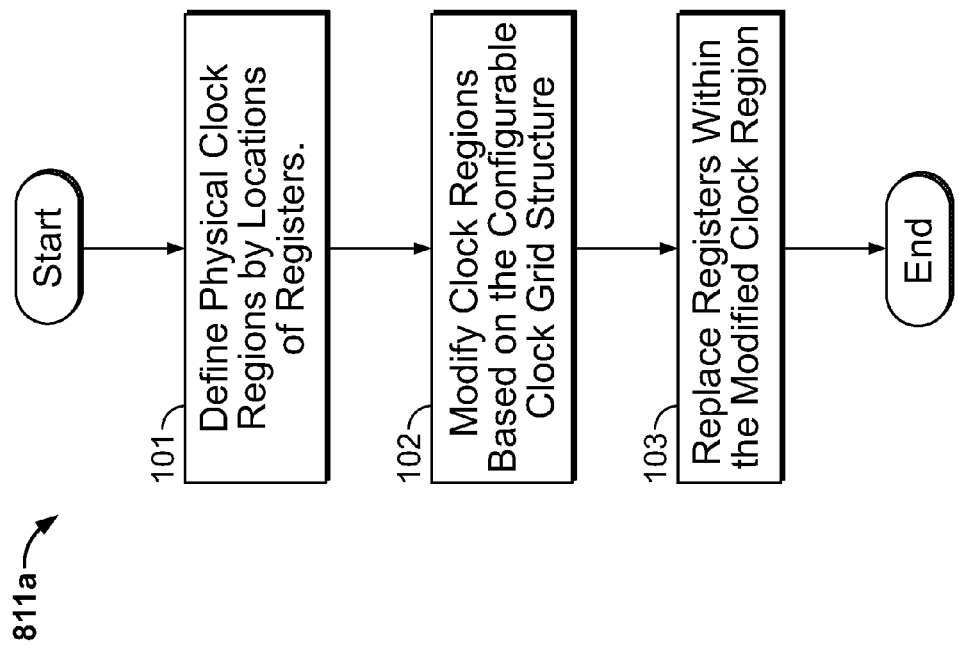

FIGS. 3-4 show example flow diagrams illustrating alternative aspects of defining a physical clock region within a circuit, e.g., 811 in FIG. 2. A circuit generally includes a number of clock regions, with all registers in the same clock region being driven by the same clock signal. Clocks are assigned to such registers at different locations within the circuit. The location of all the registers of a clock region determines the physical extent of the clock region on the device. Multiple clock regions can exist within a circuit, and the physical extent of those clock regions may overlap. The methods described herein construct a clock tree specifically for an arbitrary physical clock region using configurable clock resources, which reduces the amount of resources consumed and the size of the clock tree (i.e. only wire segments required for the clock tree are used), and also results in reduced insertion delay and clock skew.

When clock trees are fixed, the circuit usually has to select a specific clock tree for a clock region based on estimates of the size of the clock tree and the final locations of the registers in that region. Choosing the wrong fixed clock tree may result in operation failure if the tree is too small, or performance loss if the register placement is too constrained by the location of the fixed clock tree. A configurable clock tree, however, can remove such constraints.

In one embodiment, the registers can be placed without regard to the location of the clock trees, and the clock trees are generated after placement to cover each of the physical clock regions implied by placement. In other words, the physical clock regions can be determined by the physical location of the registers that are determined by a placement algorithm. As shown at the flow diagram 811a in FIG. 3, at 101, placement is performed and the physical clock regions are defined by the location of the registers in the clock region. The clock regions are then modified to take advantage of the architecture of the configurable clock grid, at 102. For example, sectors that contain only a few registers can be removed to reduce the size of the clock region, thereby reducing the number of clock resources required. At 103, placement algorithm can be used to create a final placement, where the register locations are constrained to the physical clock regions defined at 102. To improve processing efficiency, a fast placement algorithm can be used by 101, while a more complicated placement algorithm that can take advantage of the clock trees constructed for each clock region is used for 103. In this way, by confining registers to certain physical regions, the size of the clock trees can be reduced to save clock resources, and thus clock skew and clock insertion delay can be reduced.

In an alternative embodiment, as shown at the flow diagram 811b in FIG. 4, a more complex method for defining the physical clock regions can be used to perform simultaneous placement and clock tree synthesis by iteratively alternating between the two. Placement uses an iterative algorithm where at each iteration step, the placement found in the previous iteration is updated to decrease total wire length and improve performance. The placement algorithm relies on the delay characteristics of the clock trees constructed for the physical clock regions to do the iterative update. Clock tree synthesis can be performed every few iterations of the placement algorithm, to take advantage of the new locations of the registers. The physical clock regions can be defined based on the locations assigned to the registers as previously discussed at 101, and clock trees are synthesized for these clock regions at 105. Timing analysis is then performed to determine the delay characteristics of the clock trees at 107, including insertion delay and uncertainty. Advanced timing analysis techniques, including but not limited to advanced on chip variation (AOCV) and parametric on chip variation (POCV) can be used to allow accurate calculation of delay and uncertainty in the presence of local on-chip variation. The outcome of timing analysis is then used to drive the placement optimization to improve placement of registers at 108, before clock tree synthesis is performed again with more iterations (109). For example, skew and uncertainty values can be used to weight the nets between registers, to reduce the skew and uncertainty of clocks for critical paths.

In a further implementation, if a clock tree is synthesized for a clock region after the clock region has been placed, then it can take into account the timing information for that circuit. The timing information can allow the circuit to construct the clock tree to reduce the impact of the known and unknown clock skew on performance. For example, synthesis can attempt to construct a tree that reduces the clock loss between registers on a critical path, or create beneficial skew to solve setup and hold constraints. Conversely, physical synthesis can be used to optimize the circuit itself given the clock trees that have been synthesized. That is, the circuit and clock trees are optimized together via an iterative process. The methods described herein for clock tree synthesis can be used as part of the iterative method described at 105-109 for mapping a circuit to an FPGA to achieve good performance while reducing the clock resources used. Such clock tree synthesis methods can also be combined with selective tree pruning approach (for either a single tree pruning or overlapping tree pruning) discussed in connection with FIGS. 8-9 and 14. For example, the placement of registers, or the clock region can be iteratively updated based on a pruned tree, when pruning a specific subset of an initial H-tree is shown to yield improved clock loss or clock delays.

Figure 5:
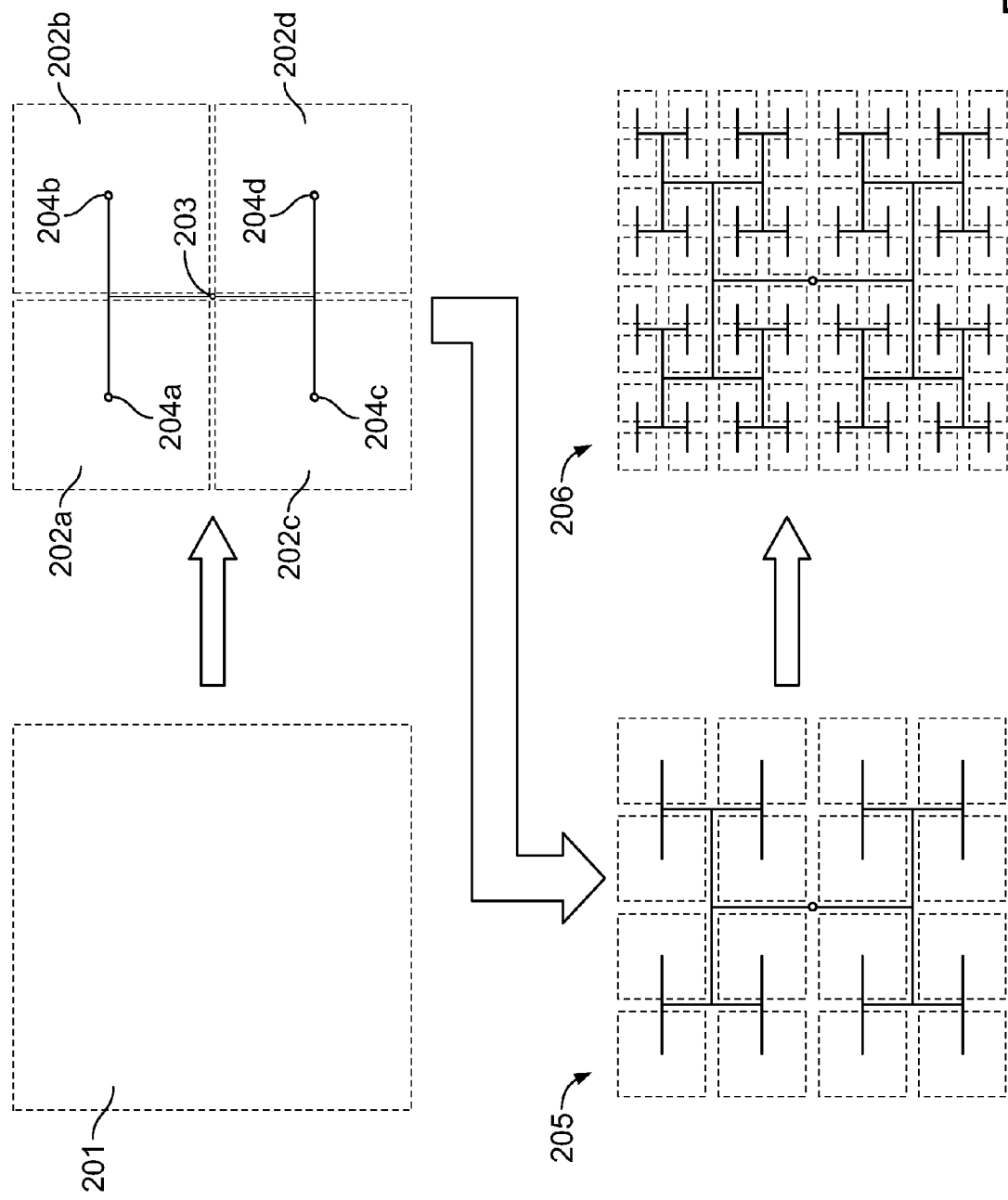
FIG. 5 shows an example diagram illustrating aspects of creating a $2''\times2''$ H-tree.

FIG. 5 shows an example diagram illustrating aspects of creating a $2^n \times 2^n$ H-tree on a configurable clock grid structure. A balanced H-tree can be constructed by partitioning the region 201 into four equal-size quadrants 202a-d. The clock is then routed from the center 203 of the original circuit, which is the root of the clock tree, to the center 204a-d of each of the four quadrants using wires of the same length and delay. The H-tree can be extended recursively by following the same procedure in each quadrant 202a-d, until the leaf partitions are small enough that the skew within a partition is negligible, e.g., as shown at blocks 205-206. The wiring of the clock tree can be done using buffers and low resistance wires to minimize the delay in the clock tree. In this way, the H-tree can be constructed so that the skew between the clocks at the leaves of the tree is zero or near zero (in practice, because of routing constraints, the skew may not be strictly zero).

The H-tree construction described in FIG. 5 works even if the original region is not square, as long as the partitioning into quadrants is done to yield equally sized rectangles at each step. Even though the path lengths in the horizontal and vertical directions can be different, all paths from the root of the tree to the leaves still have the same total length. In a configurable clock grid structure, each sector of the logic circuit, or sector, represents a leaf in the clock tree. The clock tree is generated to route the clock signal to the center of each sector, and a clock network within the sector routes the clock to some of the registers in the sector.

FIG. 6 shows an example representation of a device area illustrating pruning the clock tree when some sectors do not use the clock signal. When the clock signal is not used by every sector in the clock region bounding box 210, parts of the H-tree can be removed to save wire resources. In the respective example, the clock tree can be pruned from the leaves toward the root to remove clock segments that are not used. Any segment that is not on a path from the root to a leaf can be discarded, e.g., see 212a-c in FIG. 6.

FIG. 7 shows an example representation of a device area illustrating pruning the clock tree to cover non-canonic clock region sizes. When the size of a clock region is not the same power of 2 in both dimensions (e.g., horizontal or vertical, or both), a balanced tree can be constructed by constructing an H-Tree for the smallest H-Tree that encloses the clock region, and then pruning the tree to include only those segments required for the clock region. Two examples are shown in FIG. 7, e.g., the two clock regions with a dimension, 4×3 or 5×2, where the roots 216a-b of the clock tree may not be at the center of a clock region.

For the H-tree pruning procedure shown in FIG. 6, the height of the tree may be longer than the minimum possible, and thus the tree consumes more clock segments than necessary. The height of the tree is defined by the number of segments traversed by the clock signal from the root 216a-b, and a leaf (e.g., 217), the center of a sector. As shown in FIG. 7, the clock tree 215a has a height of 3 segments while the second tree 215b has a height of 5. Moreover, the clock tree may extend outside the clock region, e.g., as shown at 215b where the root 216b may be located outside the grid, and may fall outside the chip, making the clock construction impossible. On the other hand, the clock trees 215a-b use only one clock segment in each channel, which reduces the routing complexity supported by the clock multiplexers in the clock grid.

FIGS. 8-9 show example diagrams illustrating alternative implementations of clock tree height reduction. When the clock trees are constructed for grids that have a non-power-of-2 dimension, e.g., see 215a-b in FIG. 7, various procedures can be implemented to reduce the tree height. For example, tree height reduction can be applied to minimize the size and height of the clock tree, or alternatively multiple, possibly overlapping clock trees can be used to cover the clock region.

In some instances, as shown in FIG. 8, the pruned H-tree 215b can be reduced to the extent possible, by using more than one clock segment per channel where necessary, e.g., see 221. Clock tree 215b shows the result of shrinking the tree in dimension X (horizontally) and clock tree 220 shows the result of further shrinking the tree in dimension Y (vertically). By transforming tree 215b to 220, the resulting tree height at tree 220 has been reduced from 5 to 3 (the minimum possible), the total number segments used from 15 to 11, and the extension outside the clock region has been removed. For tree 220, however, two clock segments 221 have been used in one channel.

An alternative example is shown in FIG. 9 for a 3×5 clock region 222a or 222b. By choosing different parts of the parent $2^n \times 2^n$ tree to prune, two different balanced trees can be produced, as shown at blocks 222a-b, each with a different tree height and a different top-level partitioning allocation, e.g., see 223a-b. The top-level partitioning allocation divides the clock tree at its first level from the root of the clock tree into first-level subtrees. As the maximum clock loss due to unknown skew occurs for paths across the partitioning allocation 223a or 223b, performance can be improved via a combination of placement and clock tree construction so that the most critical paths do not cross this partitioning allocation 223a-b. In this example, different possible partitioning allocation can be obtained via mirroring the tree in dimension X or dimension Y.

FIG. 10 shows a logic flow diagram illustrating an iterative tree height reduction procedure. A first transformation 245a can be used to delete tree segments in different subtrees, starting at the root 250. The paths from the root to the roots of the next subtree, or from the root of a subtree to a next lower-level of subtree if such a lower-level subtree exists (e.g., at 251), are examined at 252. If there is a partition through these paths such that the segments being partitioned have the same direction (to or from the root) at 253, then those segments can be removed, at 254. A partition is defined as a straight-line partition horizontally or vertically through the grid, bisecting the clock segments it crosses. After the first level of the tree has been collapsed, the second level is examined by examining the paths from the roots of the first subtrees to the roots of their children subtrees. Again, if there is a partition through these paths such that all segments that are partitioned have the same direction, these segments are removed. This is applied iteratively at increasing levels of the tree (e.g., by going top-down from the root of a clock tree to the leaves of the clock tree until no more segments can be removed). It should be apparent that a segment must be removed from all the paths from the roots at level N to the roots at level N+1 for the tree to remain balanced.

A second transformation 245b can be applied to delete segments along one path from a subtree root at level N to a root at level N+1. Although in FIG. 9, the second transformation procedure 245b occurs after the first transformation 245a at the same iterative step, the two transformations 245a-b can take place in any order, independently, or inter-dependently (as shown by the dashed connector from 253, 254 to 255, indicating an optional order). For example, the second transformation 245b can take place every few iterations of the first transformation 245a, and vice versa. Both procedures can be iterated until no more segments from the clock tree can be removed.

At 255, if there is such a path where a partition crosses two segments with opposite directions, then those two segments can be removed at 256. At 257, the roots of all the subtrees up to the main root are then moved one segment towards the other subtree of that root. That is, the subtree whose segments have been deleted is shorter by two segments, but moving the subtree root increases the depth by one segment, so the result is a subtree that is one segment shorter. The sibling subtree has also been made one segment shorter by moving the root. Here the subroot may always move toward the center of the clock region, and that it can always be moved by construction of the balanced tree. The parent subtree is now two segments closer to the root, since its subtrees are one segment shorter and the root has been moved towards its parent root. The next transformation, 258 which moves the parent root, rebalanced the tree by making the current subtree one segment deeper and the other subtree one segment shorter. This process is repeated in the parent subtrees at 259 until the root is encountered. These two transformations 245a-b can be repeated until they can no longer be applied. e.g., no additional segments can be removed from the tree.

Figure 11:
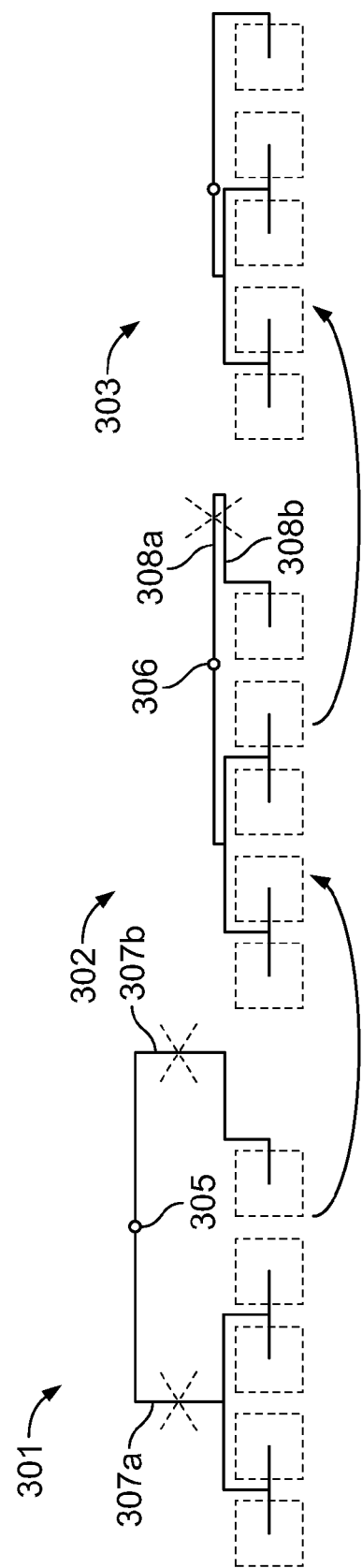
FIG. 11 provides an example diagram illustrating optimized clock tree generation for a 5×1 clock tree using the transformations discussed in FIG. 10.

FIG. 11 provides an example diagram illustrating optimized clock tree generation for a 5×1 clock tree using the transformations discussed in FIG. 10. Optimized clock trees for skewed clock regions can be generated in the manner shown at 301-303. In general, the tree height and the number of segments used can be minimized by choosing a pruning procedure, e.g., by applying procedure 245a to remove segments 307a-b having the same direction and thus moving the root from a position 305 to 306; and by applying procedure 245b to remove segments 308a-b that have opposite directions.

Figure 12:
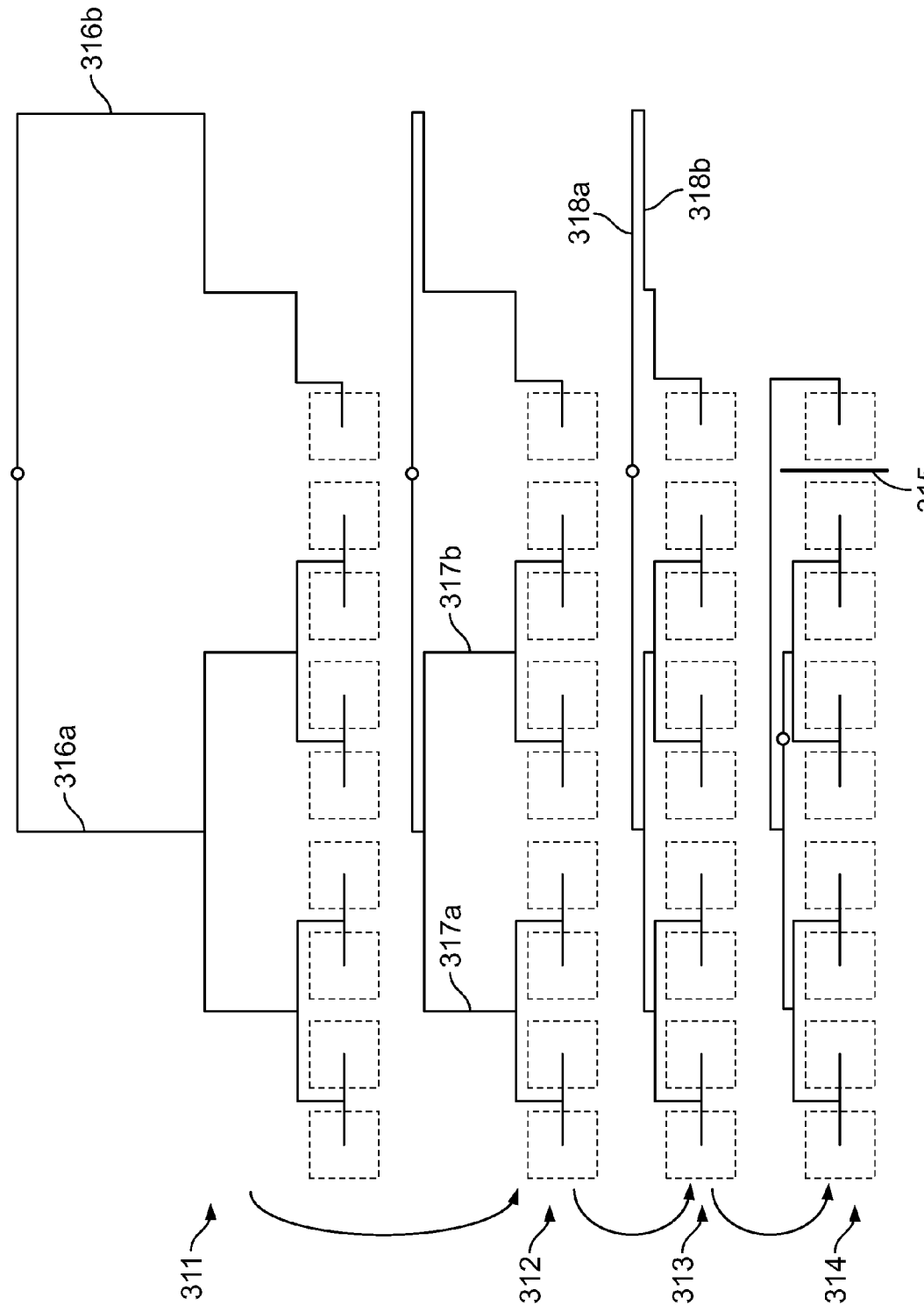
FIGS. 12-13 show example diagrams illustrating the generation of two different clock trees for a 9×1 clock region with different top-level partition allocations.
Figure 13:
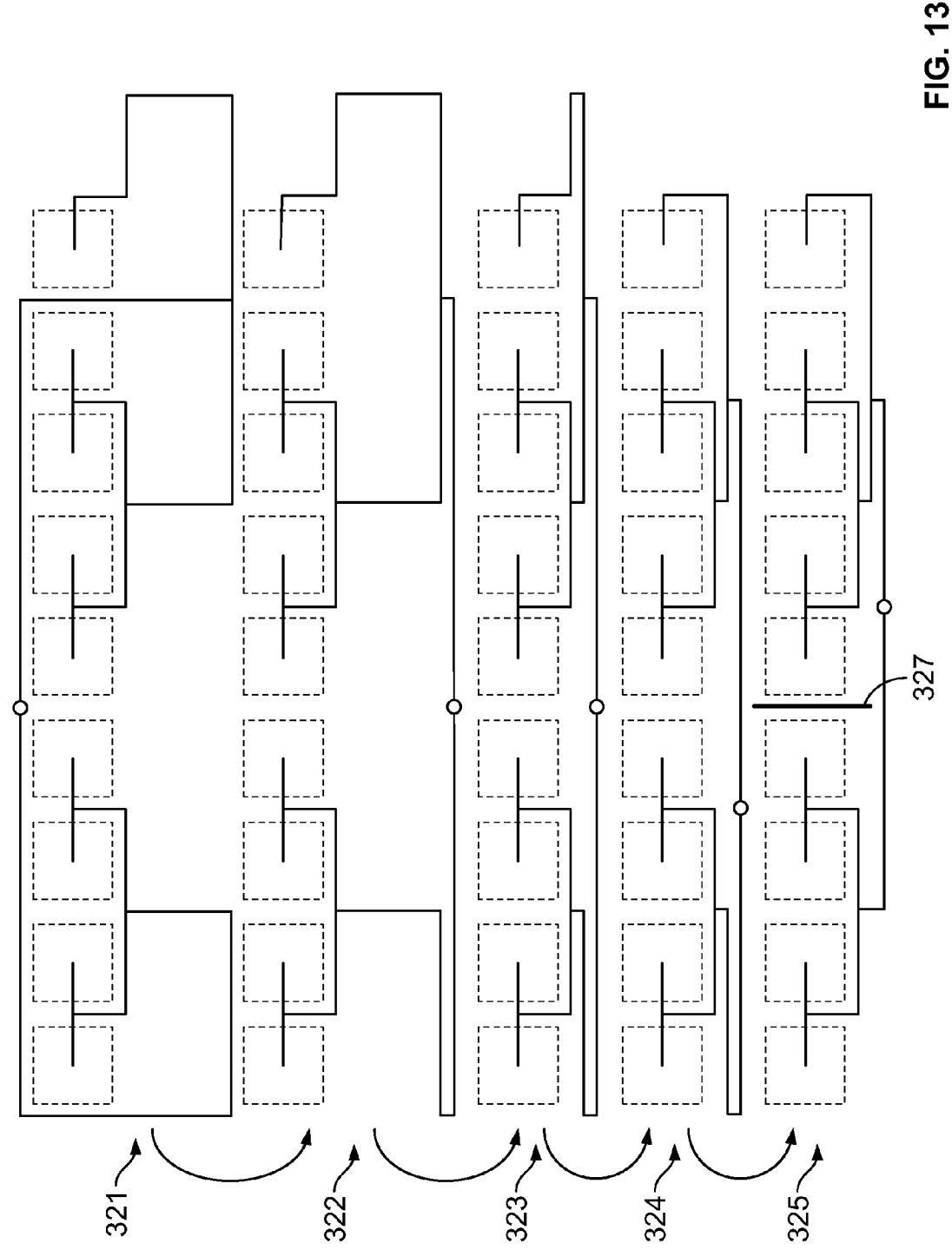

FIGS. 12-13 show example diagrams illustrating the generation of two different clock trees for a 9×1 clock region with different top-level partition allocations. For example, as shown in FIG. 12, the clock tree is reduced from 311 to 314: from 311 to 312, segments 316a-b that have the same directions are removed; from 312 to 313, segments 317a-b that have the same directions are removed; and from 313 to 314, segments 318a-b that have the opposite directions are removed. Similarly as shown in FIG. 13 in another example, the clock tree 321 can be reduced via 322-325. By choosing a different subset of the 16×16 H-tree, the top-level partition can be placed at different points of the array, e.g., see partitions 315, 327. This choice of top-level partition can be made by a clock synthesis tools based on the timing characteristics of the placed circuit to minimize the effect of the maximum clock loss.

It is also advantageous, when constructing clock trees, to place the root of the tree as close as possible to the clock source to minimize the insertion delay, e.g., the total delay from the clock source to the leaves of the tree. This can be done by choosing the subset of the $2^n \times 2^n$ H-tree to prune. There is sometimes a tradeoff between the total insertion delay and the height of the tree from the first branch point, and generally the height may be given more emphasis as it determines the maximum clock loss.

FIG. 14 provides example diagrams illustrating an alternative method for constructing clock trees having a non-power-of-2 dimension by overlapping multiple small power-of-2 trees to cover the region. FIG. 14 shows a balanced clock tree for a 6×2 clock region constructed from two 4×2 H-Trees 328a (covering sectors presented in dotted lines) and 328b (covering sectors presented in solid lines). The overlapping parts 329 of the clock tree can be left in place, or the overlap can be pruned as shown at 330. For example, the pruning of the overlapped part 329 can be implemented to reduce the resources used in the implementation, resulting in the tree 330.

When using more than one overlapping H-tree, the roots of the trees can be separated by an even-numbered distance to ensure a balanced clock tree. Otherwise, the root of the top-level tree may not be placed in a manner such that the distances to the roots of the sub-trees are all equal. However, if known skew can be used to increase performance or reliability (as further discussed in connection with FIG. 17), then a certain amount of skew can be generated between two trees for this purpose.

As shown in FIG. 14, the subtrees 328a-b are the top-level trees with the maximum clock loss between them. At FIG. 14, where the overlap has been pruned at 330, any path between a sector in 331a and a sector in 331b can incur the maximum clock loss. The pruning of the trees to remove overlap is done to reduce the effect of this maximum clock loss. That is, the choice of which parts of each clock tree to prune can be made to reduce the clock loss between the two partitions. The 331a and 331b sectors partition in FIG. 14 show one example of a partition choice.

The clock construction can have the flexibility to choose the partitioning both using the single pruned tree approach described in connection with FIGS. 12-13, and using multiple pruned trees discussed in FIG. 14. A brute-force approach to choose the best partitioning is to map a circuit using all possible partitionings and choose the best result. Although the number of partitionings may be small, performing optimized placement and routing procedures can be time-consuming. A more efficient method is to generate an initial placement that either ignores clock loss, or denotes the clock loss by a small value, and then to examine the effect of the clock loss incurred by the different pruning procedures with different partitionings using this placement, and then choosing the one that gives the best result. This can be done by computing the slack (e.g., the amount of delay that can be added to a node, or edge, before it exceeds the timing requirement for paths that use that node, or edge) for all paths that cross potential partitioning allocations. The partition with the least critical paths can be used for the first-level partitioning. A final, optimized placement is then performed using this pruning, optimizing the placement for the clock tree chosen. In this way, placement of registers and clock tree synthesis may be combined to be implemented iteratively, e.g., the resulting timing performance of clock tree pruning can be used to dynamically modify the placement and/or a clock region.

In FIG. 14, the two clock trees 328a-b overlap, and thus the registers at the ends of a path between the left and right half may select either clock tree 328a or clock tree 328b. A critical path between the left and right halves of the circuit may be able to stay in either clock tree 328a or 328b if the clock loss of moving to the other causes a performance penalty. With overlapping sub-trees, the tools can choose which clock to use at the ends of the paths to minimize the effect of clock loss.

A way to do this is to place and route the circuit while ignoring clock loss, or using a small value for clock loss. A timing analysis is then performed to generate a set of optimization constraints based on the clock assignment for each register that can choose more than one version of the same clock. Note that the problem size is reduced by the fact that the direction of the path is irrelevant. An optimization procedure then performs a register clock assignment that gives an optimal timing solution. A final routing, preceded optionally by a final placement, is then performed using the clock assignment. Since hold time constraints can be solved by the router, it may be possible to ignore hold time constraints in the optimization and rely on the router to address the hold time constraint issue.

Figure 16:
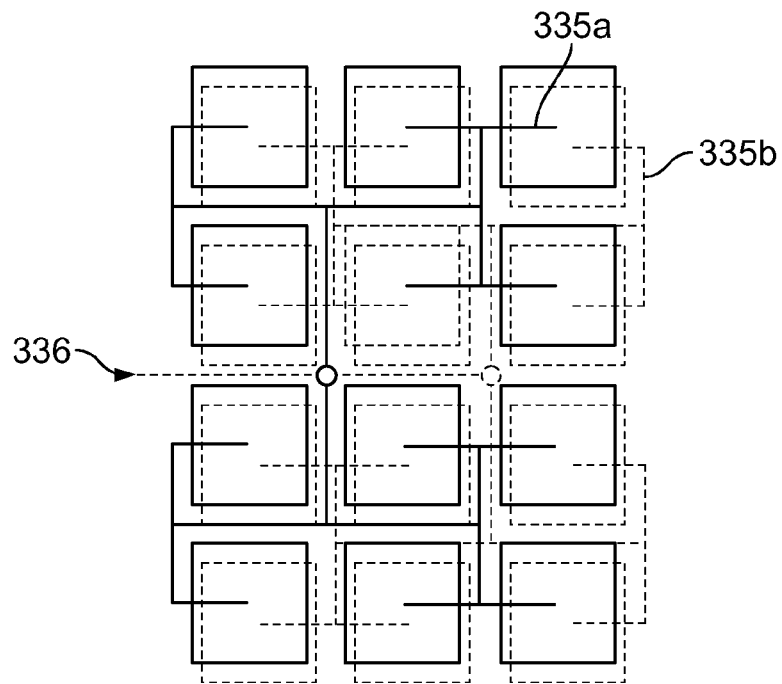

FIGS. 15-16 show example block diagrams illustrating alternative implementations of constructing a clock tree with built-in useful clock skew for dataflow from left to right. For example, the top subtree 332a uses fewer clock segments but has greater local clock skew, than the bottom subtree 332b.

Known clock skew can often be leveraged to increase the performance of a circuit. For example, the setup time for the destination register of a path can be decreased by delaying the clock to that register. Conversely, for short paths, the hold time can be decreased by delaying the clock to the source register of the path. Adjusting the clock skew of each register to optimize performance can be applied to the configurable clock grid as well. For example, if the critical paths flow in one direction, e.g., with a data flow in the circuit, then creating a clock tree with useful skew increases the circuit performance. Two example clock trees 332a-b are shown in FIG. 15. Constructing a fishbone clock tree (see e.g., 332b) can increase the maximum global unknown clock skew while reducing the local unknown clock skew. If register-register paths do not travel a long distance, the local clock skew may have a more significant impact. The fishbone clock tree can reduce the local unknown clock skew by a factor of 2 relative to a balanced H-tree.

An alternative way to take advantage of useful clock skew is to generate two or more clocks for the clock region, each skewed with respect to the other by a known amount. An example of this is shown in FIG. 16. The clocks in the clock tree 335b (in dotted line) are delayed with respect to the clocks in the clock tree 335a (in solid line) because the clock source 336 is routed from the left. In this case, the clock signal can be chosen for each register based on whether the hold or setup time constraint is at issue, as further discussed in FIG. 17.

Figure 17:
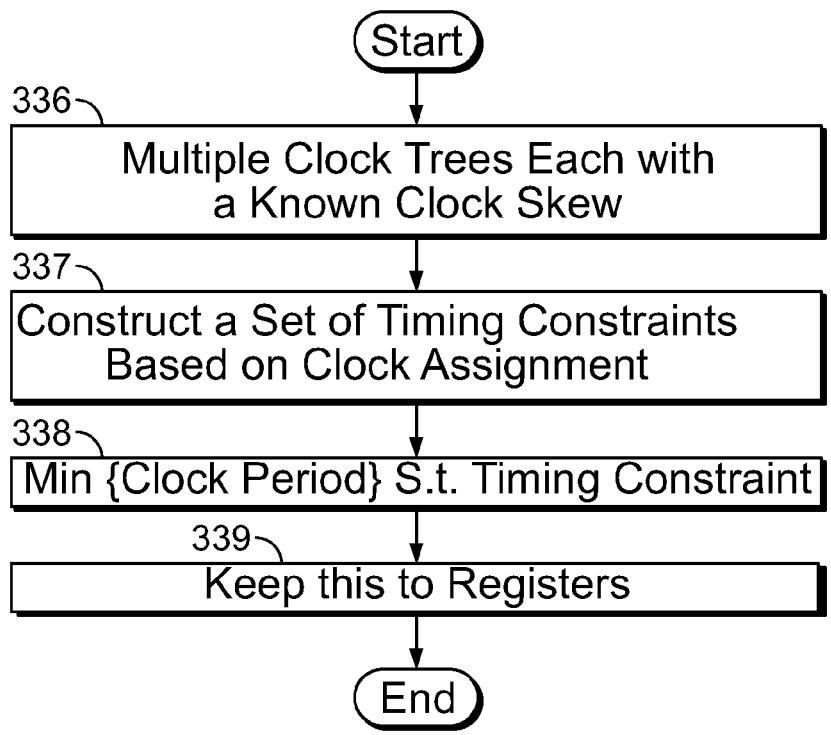
FIG. 17 provides an example logic flow diagram illustrating aspects of using useful clock skew to generate a clock tree.

FIG. 17 provides an example logic flow diagram illustrating aspects of using useful clock skew to generate a clock tree. In some instances, the circuit is placed and routed using a single clock tree and the known skew incurred by that tree, if any. At 336, multiple clock trees are provided, each with a different known clock skew. A set of timing constraints are then constructed that depend on the assignment of clock signals to the registers at 337. The clock period is then minimized subject to these timing constraints at 338. This optimization procedure produces an assignment of a clock signal to each register at 339.

Adjusting the clock skew of a register's clock is similar to the operation of retiming, which moves registers along paths in a circuit to increase performance or reduce cost. Retiming attempts to move registers to different locations on paths to minimize the delay between any two registers. For example, when the locations of registers may be fixed (e.g., in an FPGA, etc.), a register is allocated by routing a path through the register, and de-allocated by routing around the register. Moving a register can be accomplished by de-allocating a register at one location on a path while allocating it at a different location. Thus retiming in FPGAs may be constrained by the delays between the fixed register locations. That is, the amount of delay that can be adjusted via retiming may be no less than the fixed delay between fixed register locations, which may reduce the amount of performance improvement that can be achieved by retiming.

Useful clock skews may be introduced to the clock tree to compensate for the reduced performance of retiming. The effect of moving a register can be achieved by advancing or delaying the clock to the register. Increasing the delay on the clock is equivalent to moving the register backward over path delays towards the source of the register, and decreasing the clock delay can be equivalent to moving the register forward over path delays towards the destination of the register.

Figure 18:
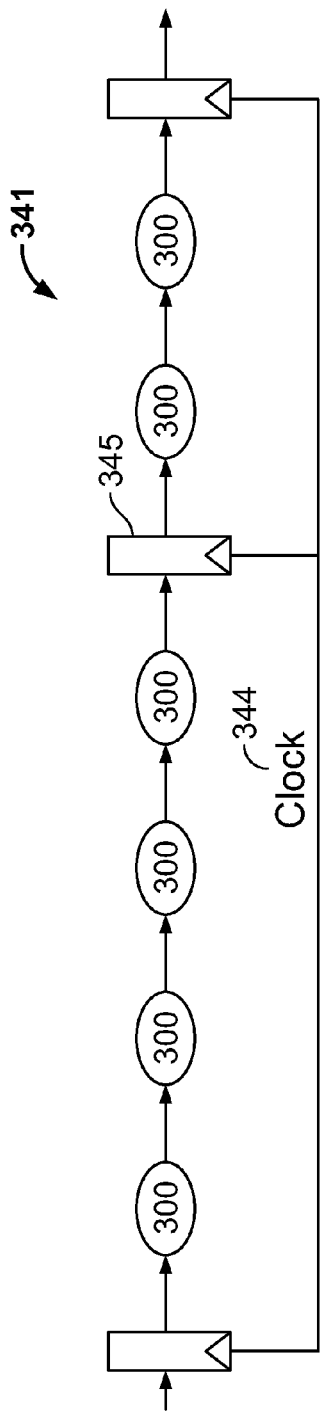
FIGS. 18-20 provide example logic representations of a sequential circuit illustrating impact of clock skews at retiming.
Figure 19:
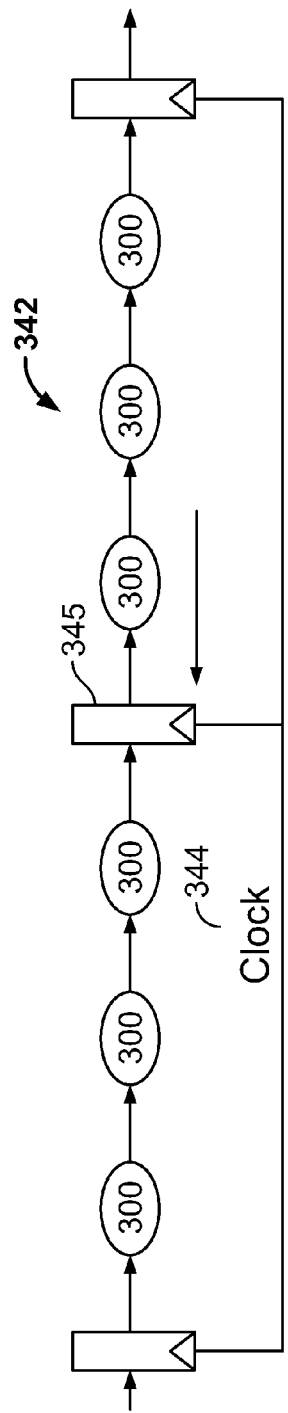
Figure 20:
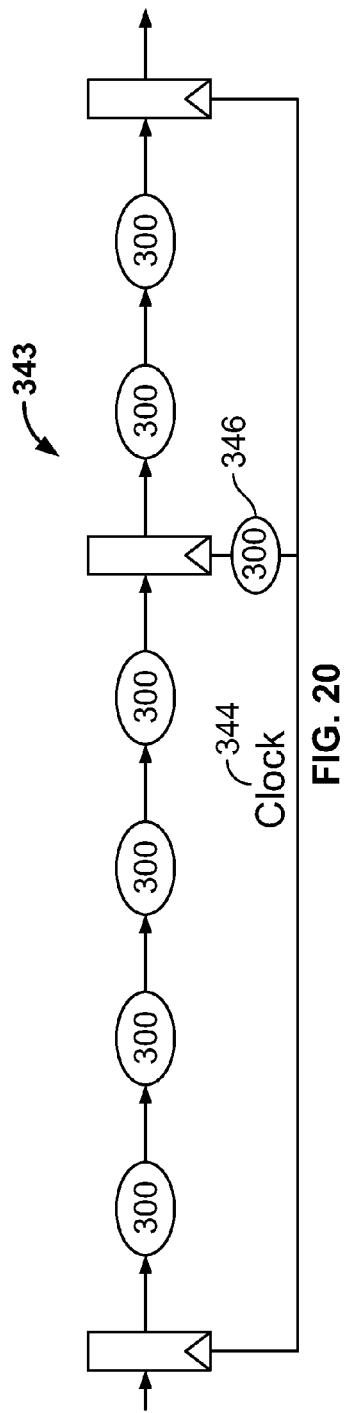

FIGS. 18-20 provide example logic representations of a sequential circuit illustrating impact of clock skews at retiming. Without considering register setup and delay, the clock signal 344 in the circuit 341 in FIG. 18 has a period of at least 1200. Moving the middle register 345 as shown in circuit 342 in FIG. 19, may not change the operation of the circuit, but allows the clock period to be reduced to 900. The effect of moving this register 345 towards the left can be accomplished by delaying the clock signal 344 for another delay of 300 (at 346), as shown at circuit 343 in FIG. 20. Thus fine-grained movement of registers can be accomplished by introducing small amounts of clock skew.

Having two or more copies of the same clock but with different skew available at each register allows the clock skew to a register to be adjusted and thus allow this fine-grained register retiming. A register can be retimed in small units of delay by selecting between clocks that have clock skew that differ in small amounts. Specifically, the fine-grained retiming achievable through the use of multiple clock trees with different skew can be applied to a system with pipelined interconnect where register assignment is performed in part after placement and routing.

In another implementation, register retiming can be performed using a combination of register movement and clock skew adjustment, with no constraint on the amount of clock skew. In practice, an upper bound may be placed on clock skew that reflects the constraints of clock generation. The clock skews determined are then used as the basis for choosing both the number of clock trees and the value of the clock skews for each. Alternatively, the retiming algorithm shown in FIGS. 18-20 would operate over discrete delays as determined by a pre-generated set of skewed clock trees.

In a further implementation, the skewed clocks can be generated using a phase-locked loop (PLL) with different phases offsets, and routed independently over the clock region. Clock skew can also be generated by using different length routes in the clock grid, e.g., as shown in FIG. 14. When the clock wire segments are implemented on different metal layers that have different delay characteristics, clock skew can be generated by selecting the appropriate metal layer to use.

FIGS. 21-25 show a series of example diagrams illustrating a recursive process for generating a minimum H-tree with a 9×10 clock region 401 of a configurable clock grid structure 400. For example, the minimum tree generation discussed in FIGS. 1-20 can be performed in a recursive manner, where every subtree of the next lower level is made minimal. An example pseudo-code segment implementing the recursive subtree minimization procedure can take a form similar to the following:

```
compressTree(root):
    //left subtree height
    lengthL=pathlength from root to subrootL
    //right subtree height
    lengthR=pathlength from root to subrootR
    // delta is the amount by which the tree height was reduced,
    // e.g., Manhattan distance between the root and newroot locations
    (locL, deltaL)=compressTree(subrootL)
    lengthL+=deltaL
    (locR, deltaR)=compressTree(subrootR)
    lengthR+=deltaR
    // If the two subtrees of a tree are minimal, then their roots
    // share the same i coordinate or the same j coordinate
    // Minimizing the height of a tree with minimal subtrees that
    // have the same height places the tree root halfway between
    // the two subtree roots
    //Minimizing the height of a tree with minimal subtrees that
    // have different heights requires also adjusting the root
    // location to rebalance the tree
    if locL.i==locR.i:
        newRoot.i=locL.i // Same i coordinate
        //the closest point equidistant to two points
        // is halfway between the two points
        newRoot.j=(locL.j+locR.j+lengthL-lengthR)/2
    else:
        newRoot.j=locL.j # Same j coordinate
        newRoot.i=(locL.i+locR.i+lengthL-lengthR)/2
    //Moving the root to minimize the tree height, reduces the
    // height of the tree by the manhattan distance between
    // the old root location and the new root location
    delta=abs(newRoot.i-root.i)+abs(newRoot.j-root.j)
    // newRoot is the new root of the tree that has been minimized
    return (newRoot, delta)
```

Figure 21:
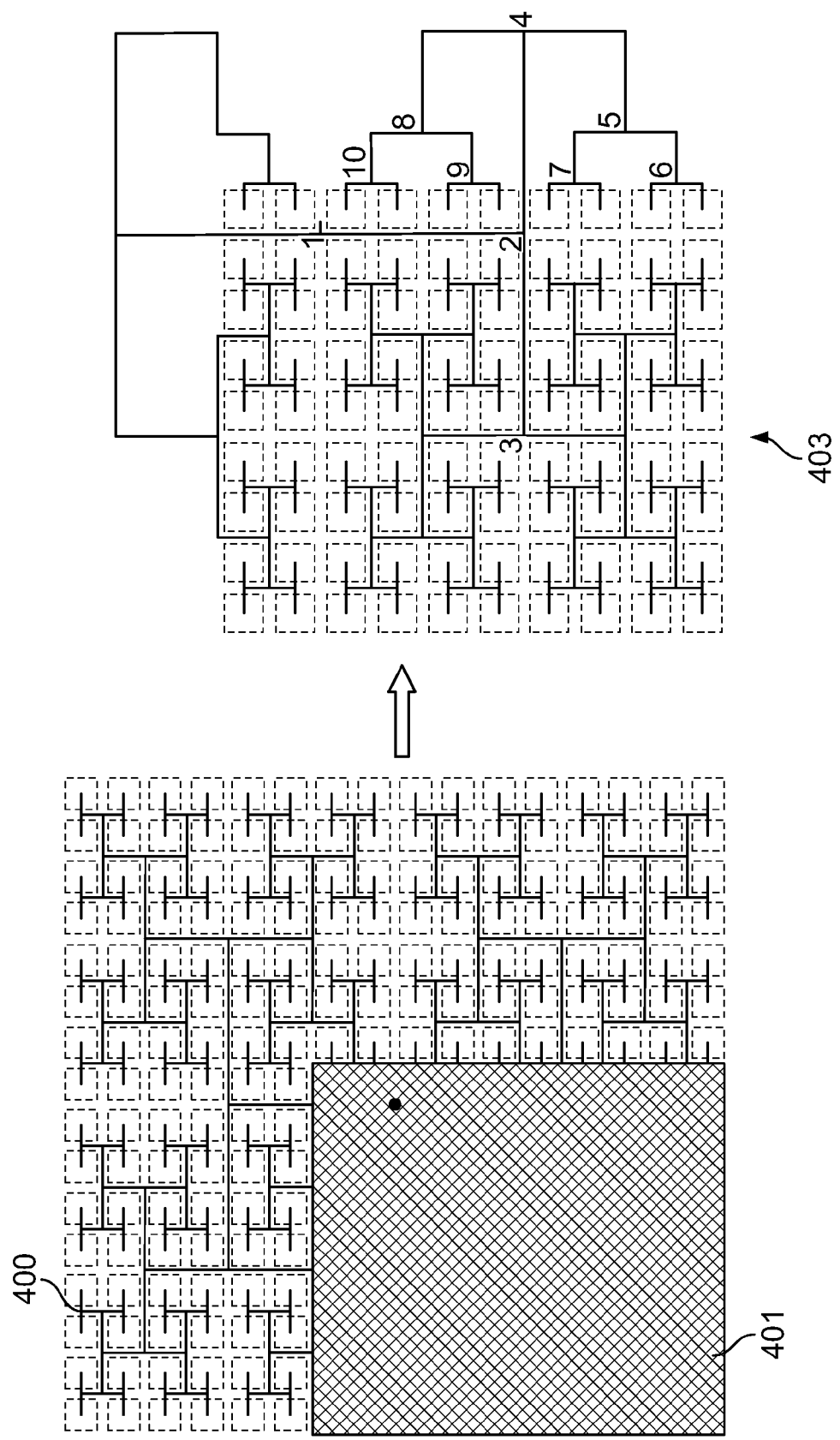
FIGS. 21-25 show a series of example diagrams illustrating an inductive process for generating a minimum H-tree with a 9×10 clock region of a configurable clock grid structure.
Figure 22:
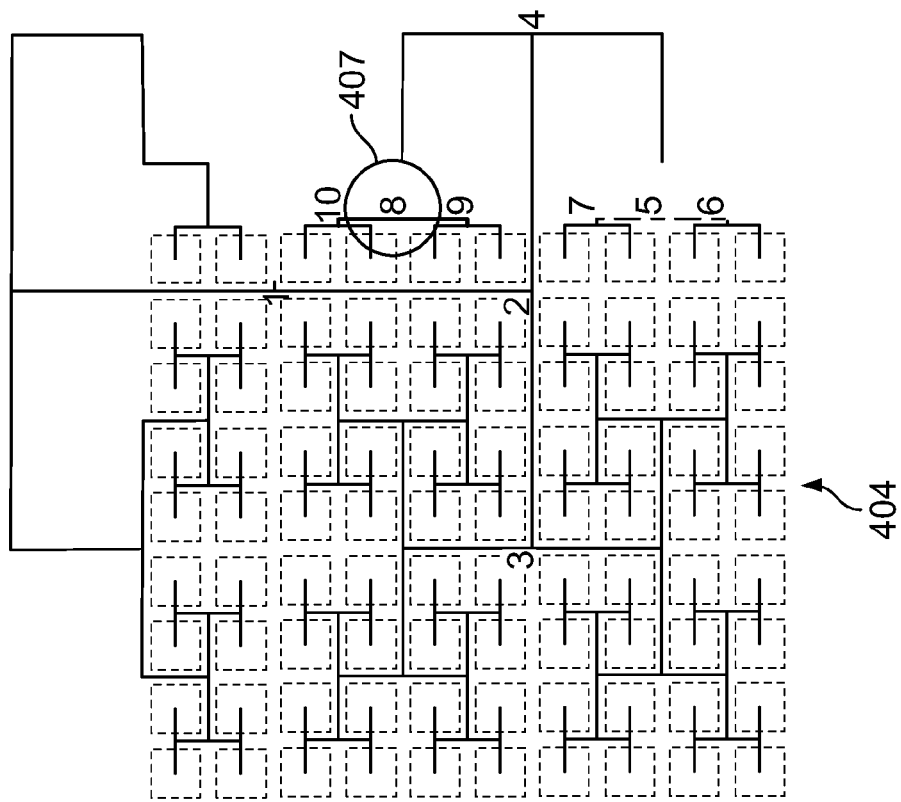
Figure 22:
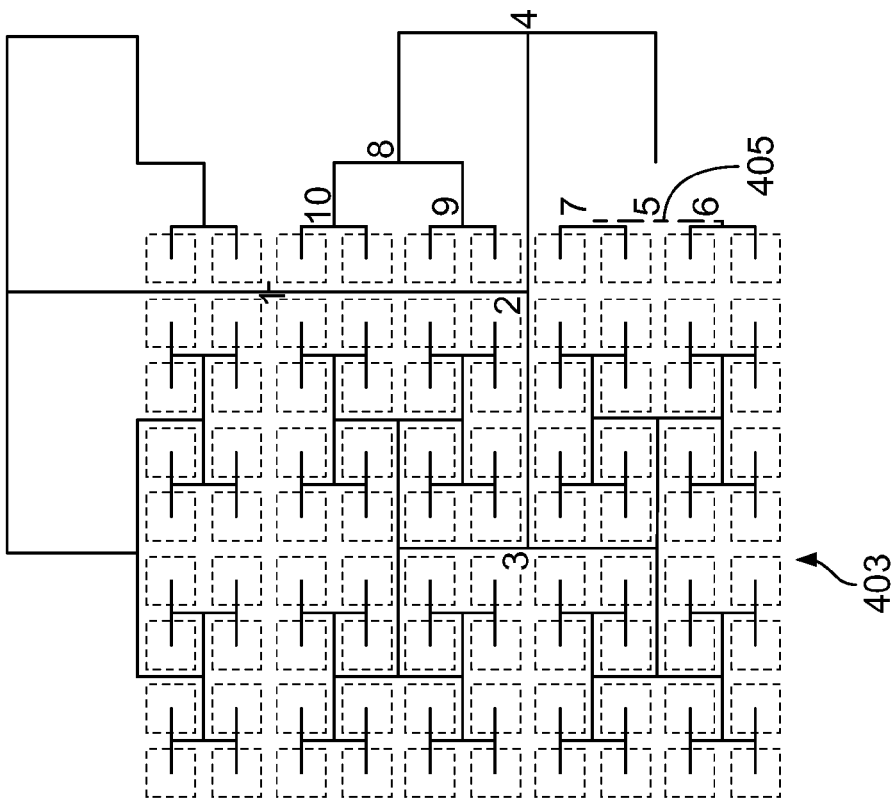
Figure 23:
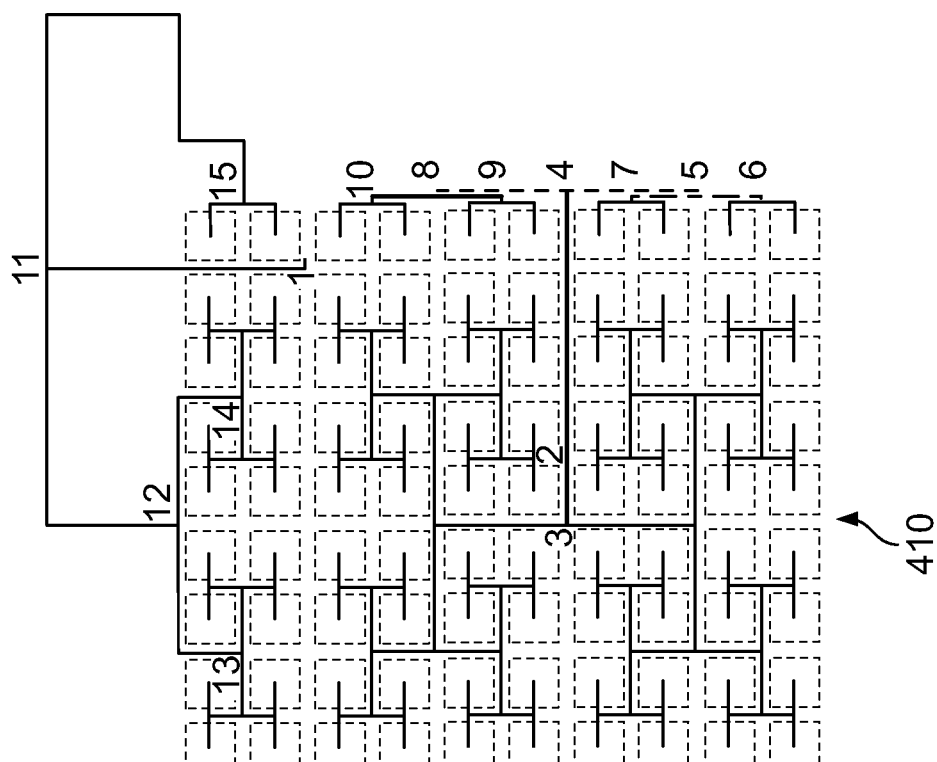
Figure 23:
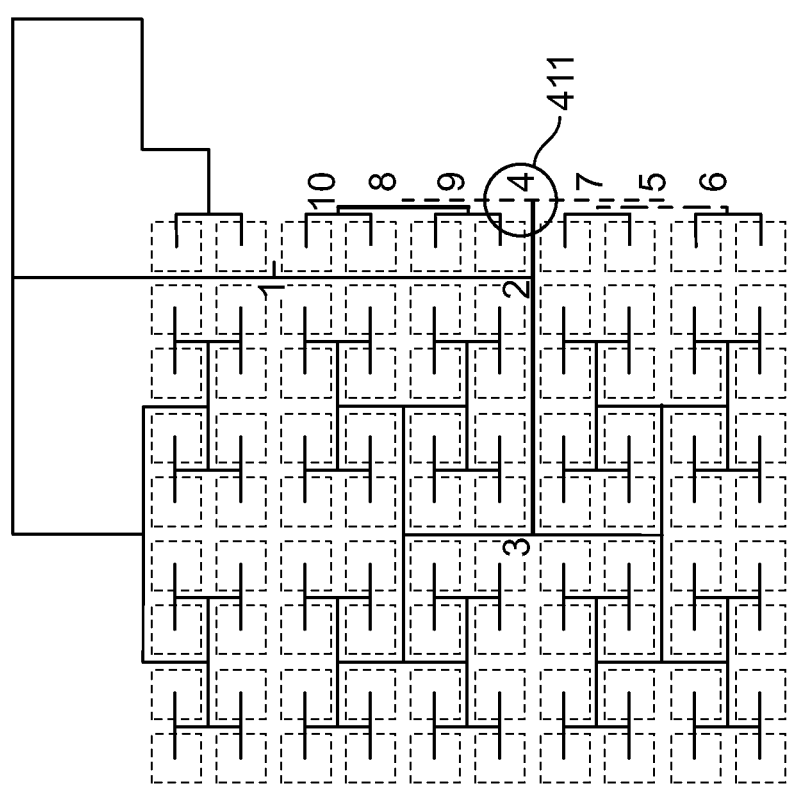
Figure 24:
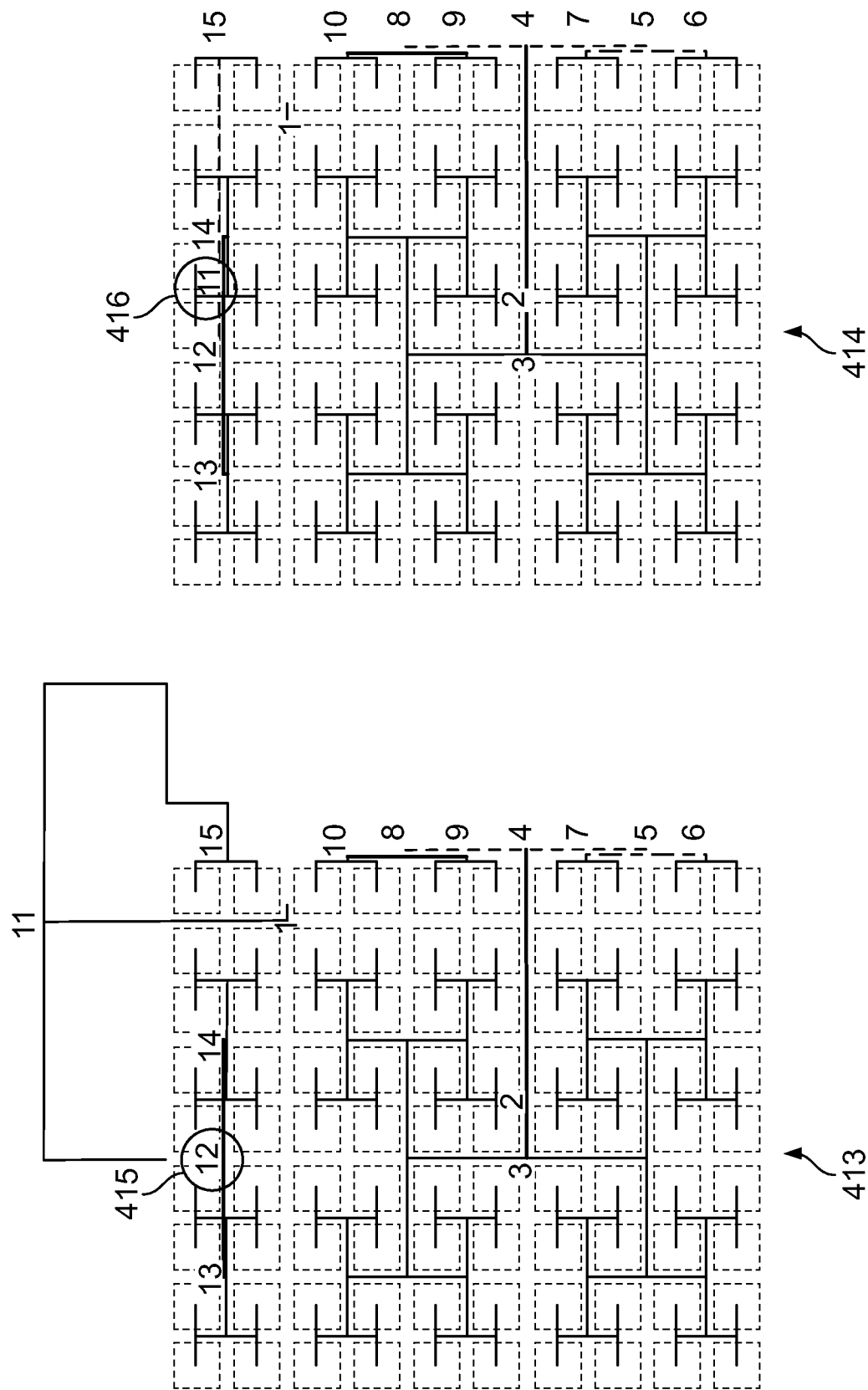
Figure 25:
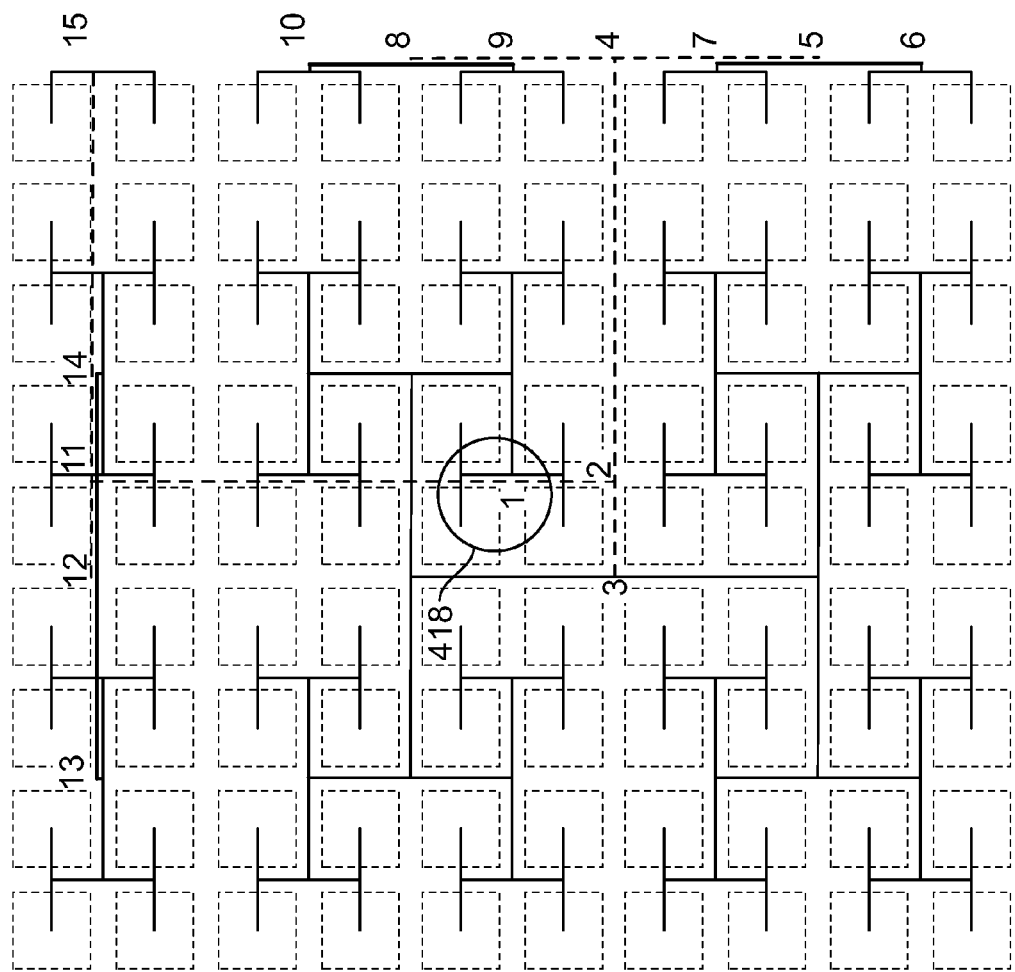

In FIG. 21, for example, the clock grid structure 400 includes a plurality of sectors and wire segments between the sectors. A 9×10 clock region 401 can be defined to build a clock tree using wire segments between the sectors. Clock tree 403 is the result of removing unused sectors and segments from the original 16×16 H-tree. The inductive process may start from the root 1, and visit the first-level subtrees 2, 3 where subtree 3 is unchanged; the second-level subtrees 4, 5, 6, 7. Here, the path lengths from 5 to 6, and from 5 to 7 are the same, and thus 5 can be moved 1 unit to minimize tree height, as shown at 405 in FIG. 22; and delta is calculated to be 1. Starting from 403, the inductive process may visit subtrees 8, 9, 10, wherein the path lengths from 8 to 9, and from 8 to 10 are the same, thus subtree 8 is moved at 407, resulting in the clock tree 404. Now starting at 404, path lengths from 4 to 5 and from 4 to 8 are the same, the subtree 4 is then moved to 411 in FIG. 23, resulting in a delta of 3. At 410, now subtrees 11, 12, 13, 14 are visited, while subtrees 13, 14 are unchanged. The path lengths from 12 to 13, and from 12 to 14 are the same, then subtree 12 is moved to 415 in FIG. 24, resulting in a delta of 1. Starting at 413 in FIG. 24, subtree 15 is visited; path length from 11 to 12 is 7, and path length from 11 to 15 is 10; then a new coordinate for subtree 11 is calculated to be (4+9+7−10)/2=5, and subtree 11 is then moved to 416, with a delta of 6. Starting from 414, root 1 is visited; the path length from 1 to 2 is 7, and the path length from 1 to 11 is 10. A new i coordinate for 1 can be calculated as (4+9+7−10)/2=5; and thus 1 can be moved to 418 in FIG. 25.

As discussed above, the algorithm identifies the new root and subtree roots, and the changed part of the tree can be rerouted. Layer assignment can be implemented such as making all original trees on one plane, or recursively assign planes to new routes. For example, a pseudo-code segment for recursive layer assignment may take a form similar to the following:

```
assignLayer(root, rootList, plane):
    // Check whether recursion has bottomed out
    if root is not in rootList:
        return plane
    subrootL=left subroot of root
    Remove all old segments between root and subrootL
    planeL=assignLayer(subrootL, rootList, plane)
    planeL=routeStraight(root, subrootL, planeL)
    subrootR=right subroot of root
    Remove all segments between root and subrootR
    planeR=assignLayer(subrootR, rootList, plane)
    planeR=routeStraight(root, subrootR, planeR)
    // If one of the planes is "too low", we need to raise segments
    if planeR-planeL>1:
        // Raise the left subtree to be reachable by planeR
        fixRoute(leftSubtree, planeR)
    elseif planeL-planeR>1:
        // Raise the right subtree to be reachable by planeL
        fixRoute(rightSubtree, planeL)
    return max(planeL, planeR)
routeStraight(root, subroot, plane):
    // Construct new route backwards from subroot to root
    for each seam in the straight line from subroot to root:
        if there is already a tree segment on plane in seam:
            plane=plane+1
        assign segment to plane
    return plane
fixRoute(subtree, plane):
    // Raise the segments of the subtree so that
    // it is routable from the subroot
    newPlane=plane
    for segment in subtree:
        if segment.plane==newPlane: return
        segment.plane=newPlane
        newPlane=newPlane-1
        return newPlane
    assert False
```

Figure 26:
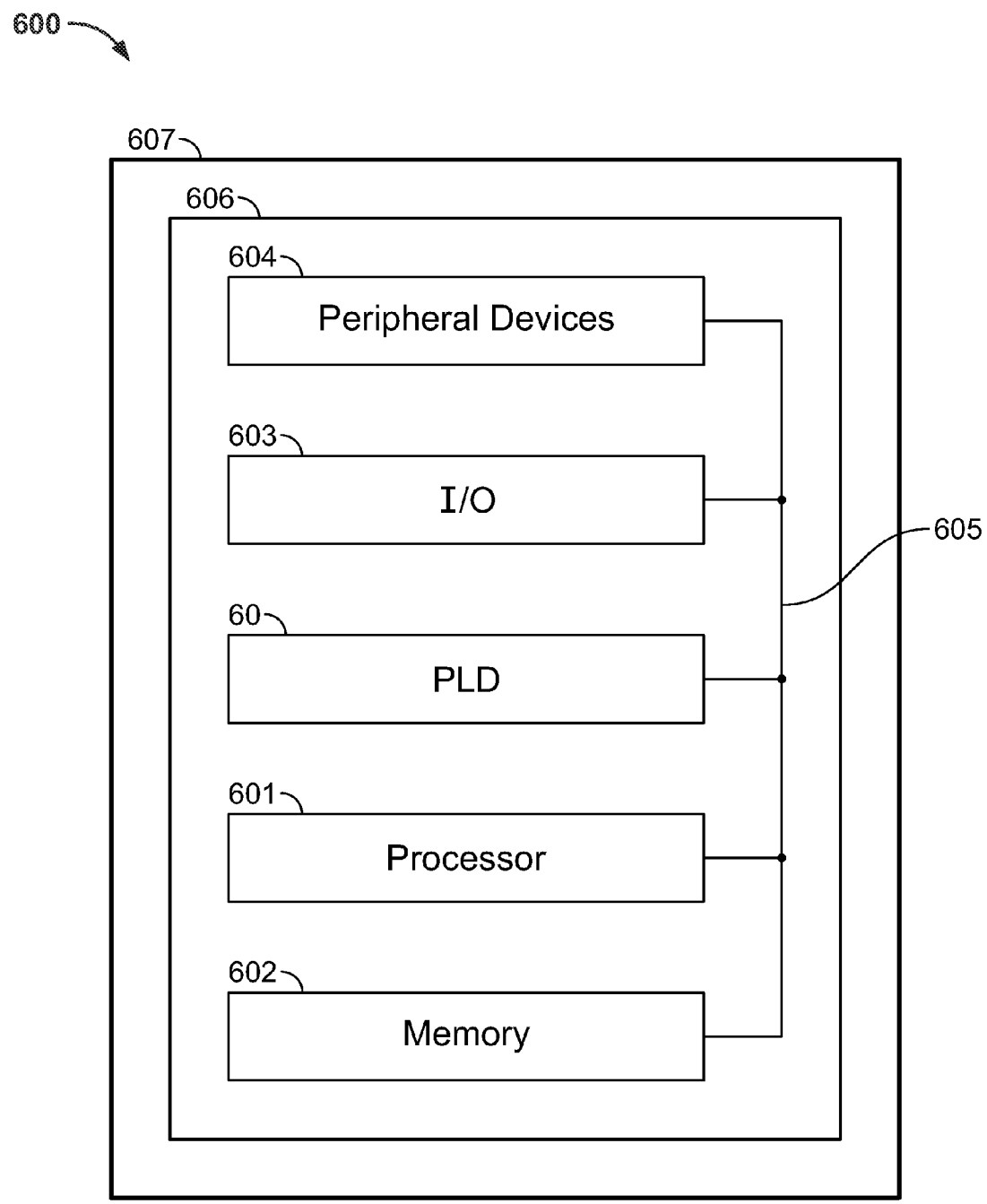
FIG. 26 is a simplified block diagram of an exemplary system employing a programmable logic device incorporating the present invention.

FIG. 26 is a simplified block diagram of an exemplary system employing a programmable logic device incorporating the present invention. A programmable logic device (PLD) 60 configured to include arithmetic circuitry according to any implementation of the present invention may be used in many kinds of electronic devices. One possible use is in an exemplary data processing system 600 shown in FIG. 26. Data processing system 600 may include one or more of the following components: a processor 601; memory 602; I/O circuitry 603; and peripheral devices 604. These components are coupled together by a system bus 605 and are populated on a circuit board 606 which is contained in an end-user system 607.

System 600 can be used in a wide variety of applications, such as computer networking, data networking, instrumentation, video processing, digital signal processing, Remote Radio Head (RRH), or any other application where the advantage of using programmable or reprogrammable logic is desirable. PLD 60 can be used to perform a variety of different logic functions. For example, PLD 60 can be configured as a processor or controller that works in cooperation with processor 601. PLD 60 may also be used as an arbiter for arbitrating access to shared resources in system 600. In yet another example, PLD 60 can be configured as an interface between processor 601 and one of the other components in system 600. It should be noted that system 600 is only exemplary, and that the true scope and spirit of the invention should be indicated by the following claims.

Various technologies can be used to implement PLDs 60 as described above and incorporating this invention.

Figure 27:
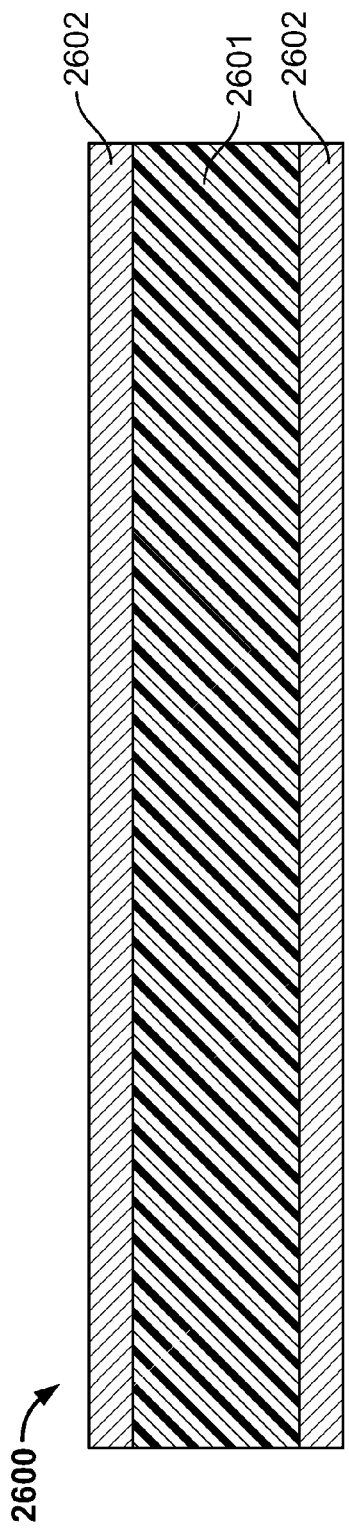
FIG. 27 is a cross-sectional view of a magnetic data storage medium encoded with a set of machine-executable instructions for performing the method according to the present invention for configuring a programmable integrated circuit device to perform sector-based clock routing.

FIG. 27 presents a cross section of a magnetic data storage medium 2600 which can be encoded with a machine executable program that can be carried out by systems such as the aforementioned personal computer, or other computer or similar device. Medium 2600 can be a floppy diskette or hard disk, or magnetic tape, having a suitable substrate 2601, which may be conventional, and a suitable coating 2602, which may be conventional, on one or both sides, containing magnetic domains (not visible) whose polarity or orientation can be altered magnetically. Except in the case where it is magnetic tape, medium 2600 may also have an opening (not shown) for receiving the spindle of a disk drive or other data storage device.

The magnetic domains of coating 2602 of medium 2600 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 28:
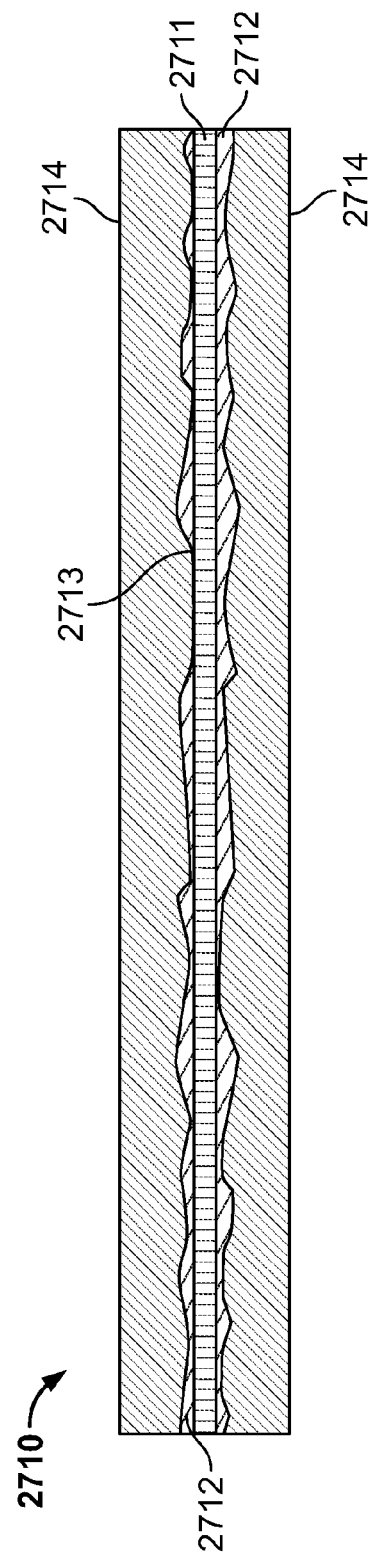
FIG. 28 is a cross-sectional view of an optically readable data storage medium encoded with a set of machine executable instructions for performing the method according to the present invention for configuring a programmable integrated circuit device to perform sector-based clock routing.

FIG. 28 shows a cross section of an optically-readable data storage medium 2710 which also can be encoded with such a machine-executable program, which can be carried out by systems such as the aforementioned personal computer, or other computer or similar device. Medium 2710 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 2710 preferably has a suitable substrate 2711, which may be conventional, and a suitable coating 2712, which may be conventional, usually on one or both sides of substrate 2711.

In the case of a CD-based or DVD-based medium, as is well known, coating 2712 is reflective and is impressed with a plurality of pits 2713, arranged on one or more layers, to encode the machine-executable program. The arrangement of pits is read by reflecting laser light off the surface of coating 2712. A protective coating 2714, which preferably is substantially transparent, is provided on top of coating 2712.

In the case of magneto-optical disk, as is well known, coating 2712 has no pits 2713, but has a plurality of magnetic domains whose polarity or orientation can be changed magnetically when heated above a certain temperature, as by a laser (not shown). The orientation of the domains can be read by measuring the polarization of laser light reflected from coating 2712. The arrangement of the domains encodes the program as described above.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A clock-tree construction method for a configurable clock grid structure, comprising:
   defining a clock region within a configurable clock grid structure having a plurality of sectors and a plurality of wire segments;
   constructing an H-tree that covers the clock region;
   aligning the clock region within the H-tree;
   reducing a size or a height of the H-tree to generate a clock tree; and
   configuring a programmable integrated circuit device using the configurable clock grid structure of the generated clock tree.

2. The method of claim 1, wherein the clock region is defined based on physical locations of a plurality of registers.

3. The method of claim 2, further comprising:
   modifying the clock region based on the configurable clock grid structure; and
   modifying the physical locations of the plurality of registers within the modified clock region.

4. The method of claim 2, further comprising:
   synthesizing the clock tree for the clock region;
   determining delay characteristics of the clock tree based on timing analysis; and
   iteratively re-placing the plurality of registers to improve delay performance.

5. The method of claim 1, wherein the clock region is aligned to a lower-left H-tree quadrant.

6. The method of claim 1, wherein the clock region has an arbitrary size or shape.

7. The method of claim 1, wherein a root of the clock tree is placed in proximity to a clock source to reduce clock insertion delay.

8. The method of claim 1,
   wherein reducing a size or a height of the H-tree includes:
   pruning the H-tree and removing an unused segment from the H-tree; and
   performing a tree height reduction procedure to the pruned H-tree.

9. The method of claim 8, wherein the tree height reduction procedure includes:
   identifying a first path connecting a first root of a first subtree and a second root of a second subtree, a second path connecting the first root of the first subtree and a third root of a third subtree, wherein
   the second and third subtrees are next-level subtrees to the first subtree;
   identifying two segments with a same direction from the first and the second paths, wherein
   the two segments are traversed by a straight line partition horizontally or vertically through the configurable clock grid structure; and
   removing the two segments from the pruned H-tree.

10. The method of claim 8, wherein the tree height reduction procedure further includes:
    identifying a path connecting a first root of a first subtree and a second root of a second subtree, wherein the second subtree is a next-level subtree to the first subtree;
identifying two segments with an opposite direction on the path, wherein
the two segments are traversed by a straight line partition horizontally or vertically through the configurable clock grid structure;
removing the two segments from the pruned H-tree; and
moving the first root towards a third subtree at a same level of the first subtree.

11. The method of claim 8, wherein the H-tree has a smallest size to cover the clock region.

12. The method of claim 1, further comprising:
assigning a plane of the configurable clock grid structure to the clock tree.

13. The method of claim 1, further comprising:
determining a first top-level partition for the clock tree;
choosing a first subset of the H-tree to prune based on the first top-level partition; and
obtaining a first pruned H-tree and a first insertion delay from the first pruned H-tree.

14. The method of claim 13, further comprising:
determining a second top-level partition for the clock tree;
choosing a second subset of the H-tree to prune based on the second top-level partition;
obtaining a second pruned H-tree and a second insertion delay from the second pruned H-tree; and
selecting the second top-level partition for pruning when the second insertion delay is less than the first insertion delay.

15. The method of claim 1, wherein the H-tree is a combined H-tree including a first H-tree that covers a first region smaller than the clock region and
a second H-tree that covers a second region smaller than the clock region.

16. The method of claim 15, wherein the first H-tree has an X-dimension and a Y-dimension of a power of two.

17. The method of claim 15, wherein the first H-tree and the second H-tree have an overlapping subtree.

18. The method of claim 17, further comprising:
determining a first top-level partition for the combined H-tree;
pruning the overlapping subtree based on the first top-level partition;
determining a first critical path that traverses the first top-level partition; and
estimating a first clock loss for a clock signal transmitting along the first critical path.

19. The method of claim 18, further comprising:
determining a second top-level partition for the combined H-tree;
pruning the overlapping subtree based on the second top-level partition;
determining a second critical path that traverses the second top-level partition;
estimating a second clock loss for a second clock signal transmitting along the second critical path; and
selecting the second top-level partition to prune the overlapping subtree when the second clock loss is less than the first clock loss.

20. The method of claim 15, further comprising:
selecting the first H-tree to transmit a clock signal.

21. The method of claim 20, further comprising:
performing timing analysis to generate a set of timing constraints for the first H-tree.

22. The method of claim 1, further comprising:
obtaining an initial placement of a plurality of registers within the configurable clock grid structure, wherein
the initial placement includes a first location of the plurality of registers;
the clock region is defined based on the initial placement of the plurality of registers;
selectively pruning a first subset of the H-tree to generate a first pruned clock tree, wherein
the first pruned clock tree has a first clock timing factor; and
modifying the initial placement of the plurality of registers based on the first pruned clock tree.

23. The method of claim 22, further comprising:
pruning a second subset of the H-tree to generate a second pruned clock tree, wherein
the second pruned clock tree has a second clock timing factor; and
selecting the first pruned clock tree when the first clock timing factor is less than the second clock timing factor.

24. The method of claim 22, further comprising:
modifying the clock region based on the first pruned clock tree.

25. The method of claim 22, wherein the first clock timing factor includes any of a clock insertion delay, or a clock loss incurred by pruning of the first clock tree.

26. A processor-readable non-transitory medium storing processor-executable instructions for clock-tree construction on a configurable clock grid structure having a plurality of sectors and a plurality of wire segments, the processor-executable instructions comprising:
instructions executable by a processor to define a clock region within the configurable clock grid structure;
instructions executable by the processor to construct an H-tree that covers the clock region;
instructions executable by the processor to align the clock region within the H-tree;
instructions executable by the processor to reduce a size or a height of the H-tree to generate a clock tree; and
instructions executable by the processor to configure a programmable integrated circuit device using the configurable clock grid structure of the generated clock tree.

27. Circuitry operated with a clock signal transmitted through a configurable clock tree, comprising:
a plurality of sectors, wherein
a clock region is defined to cover one or more sectors from the plurality of sectors; and
a plurality of wire segments, wherein
a subset of the plurality of wire segments are selected to form the configurable clock tree,
wherein the configurable clock tree is generated by reducing a size or a height of an H-tree, and
wherein the H-tree is constructed from the plurality of wire segments to cover the clock region.

* * * * *